United States Patent
Kim et al.

(10) Patent No.: US 9,800,390 B2
(45) Date of Patent: Oct. 24, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG Electronics Inc., Seoul (KR)

(72) Inventors: Byounggill Kim, Seoul (KR); Jaehyung Kim, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/465,394

(22) Filed: Aug. 21, 2014

(65) Prior Publication Data
US 2015/0055727 A1  Feb. 26, 2015

Related U.S. Application Data

(60) Provisional application No. 61/869,074, filed on Aug. 23, 2013.

(51) Int. Cl.
*H04L 5/00* (2006.01)
*H04H 20/33* (2008.01)
(Continued)

(52) U.S. Cl.
CPC .......... *H04L 5/0092* (2013.01); *H04H 20/33* (2013.01); *H04H 20/423* (2013.01);
(Continued)

(58) Field of Classification Search
USPC ................ 375/260, 267, 299, 349
See application file for complete search history.

(56) References Cited

U.S. PATENT DOCUMENTS

2005/0111522 A1\* 5/2005 Sung ................... H04J 11/0069
                                                                           375/145
2010/0158047 A1  6/2010 Lee et al.
(Continued)

FOREIGN PATENT DOCUMENTS

EP  2536133 A2  12/2012
EP  2557717 A1  2/2013
(Continued)

*Primary Examiner* — Kabir A Timory
(74) *Attorney, Agent, or Firm* — Dentons US LLP

(57) ABSTRACT

The apparatus for transmitting broadcast signals, the apparatus comprises an encoder for encoding service data corresponding to each of a plurality of data transmission path, wherein each of the data transmission path carries at least one service component, a frame builder for building at least one signal frame including the encoded service data, a modulator for modulating the at least one signal frame by an OFDM (Orthogonal Frequency Division Multiplex) scheme, a transmitter for transmitting the broadcast signals carrying the at least one modulated signal frame, wherein each of the at least one signal frame includes a preamble having signaling data, wherein the signaling data includes size of FFT, information of whether the signal frame including EAC message or not and information relating to the service data of the signal frame.

6 Claims, 34 Drawing Sheets

(51) Int. Cl.
  *H04H 20/42*    (2008.01)
  *H04H 20/59*    (2008.01)
  *H04L 27/26*    (2006.01)

(52) U.S. Cl.
  CPC .......... *H04H 20/59* (2013.01); *H04L 5/0048* (2013.01); *H04L 27/2613* (2013.01)

(56) References Cited

U.S. PATENT DOCUMENTS

| | | | |
|---|---|---|---|
| 2010/0246719 A1* | 9/2010 | Ko | H04L 5/0053 375/303 |
| 2011/0044401 A1* | 2/2011 | Ko et al. | 375/295 |
| 2011/0131464 A1 | 6/2011 | Ko et al. | |
| 2012/0327879 A1* | 12/2012 | Stadelmeier | H04B 7/0689 370/329 |
| 2013/0177090 A1* | 7/2013 | Yang et al. | 375/260 |

FOREIGN PATENT DOCUMENTS

| | | |
|---|---|---|
| EP | 2629444 A1 | 8/2013 |
| JP | 2010200122 A | 9/2010 |
| JP | 2011010310 A | 1/2011 |
| JP | 2011171881 A | 9/2011 |
| WO | 2010/055981 A1 | 5/2010 |
| WO | 2012/067362 A2 | 5/2012 |

\* cited by examiner

FIG. 18

(a) DBPSK mapping rule $m_i[-1] = 1,$
$m_i[n] = m_i[n-1]$ if $s_i[n] = 0$
$m_i[n] = -m_i[n-1]$ if $s_i[n] = 1,$
$m_q[n] = 0,$
$n = 0 \sim L-1$, L: # of Reed Muller encoded signaling bits (b) DQPSK mapping rule $y[-1] = 0$
$y[n] = y[n-1]$ if $s_i[n] = 0$ and $s_q[n] = 0$
$y[n] = (y[n-1]+3) \mod 4$ if $s_i[n] = 0$ and $s_q[n] = 1$
$y[n] = (y[n-1]+1) \mod 4$ if $s_i[n] = 1$ and $s_q[n] = 0$
$y[n] = (y[n-1]+2) \mod 4$ if $s_i[n] = 1$ and $s_q[n] = 1$, $n = 0 \sim L-1$, L: # of Reed Muller encoded signaling bits $m_i[n] = 1/\sqrt{2}$   $m_q[n] = 1/\sqrt{2}$ if $y[n] = 0$
$m_i[n] = -1/\sqrt{2}$  $m_q[n] = 1/\sqrt{2}$ if $y[n] = 1$
$m_i[n] = -1/\sqrt{2}$  $m_q[n] = -1/\sqrt{2}$ if $y[n] = 2$
$m_i[n] = 1/\sqrt{2}$   $m_q[n] = -1/\sqrt{2}$ if $y[n] = 3$, $n = 0 \sim L-1$, L: # of Reed Muller encoded signaling bits FIG. 19
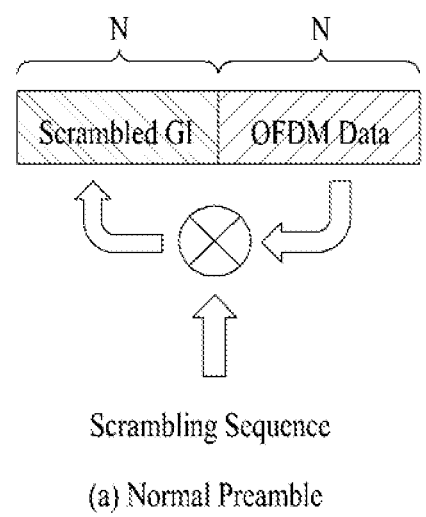
(a) Normal Preamble
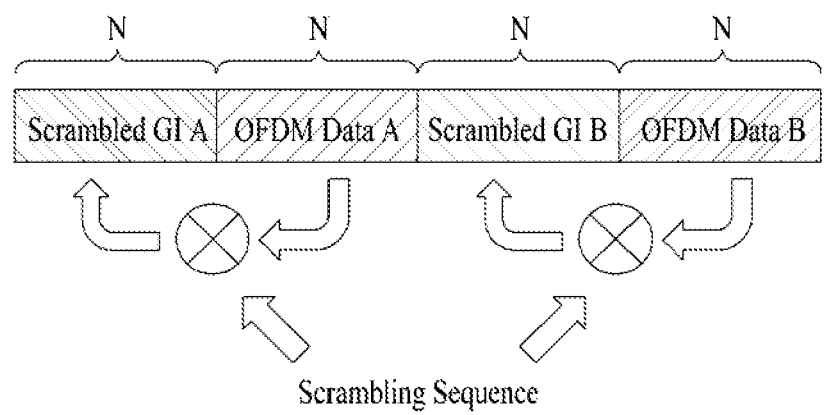
(b) Robust Preamble Binary Chirp-like Sequence

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

Pursuant to 35 U.S.C. §119(e), this application claims the benefit of U.S. Provisional Application Ser. No. 61/869,074, filed on Aug. 23, 2013, which is hereby incorporated by reference as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

To achieve the object and other advantages and in accordance with the purpose of the invention, as embodied and broadly described herein, a method for transmitting broadcast signals, the method comprises encoding service data corresponding to each of a plurality of data transmission path, wherein each of the data transmission path carries at least one service component, building at least one signal frame including the encoded service data, modulating the at least one signal frame by an OFDM (Orthogonal Frequency Division Multiplex) scheme, transmitting the broadcast signals carrying the at least one modulated signal frame, wherein each of the at least one signal frame includes a preamble having signaling data, wherein the signaling data includes size of FFT, information of whether the signal frame including EAC message or not and information relating to the service data of the signal frame.

Advantageous Effects

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

FIG. 18 shows mathematical expressions representing relationships between input information and output information or mapping rules of the DQPSK/DBPSK mapper 17040 according to an embodiment of the present invention.

FIG. 19 illustrates preamble structures according to an embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
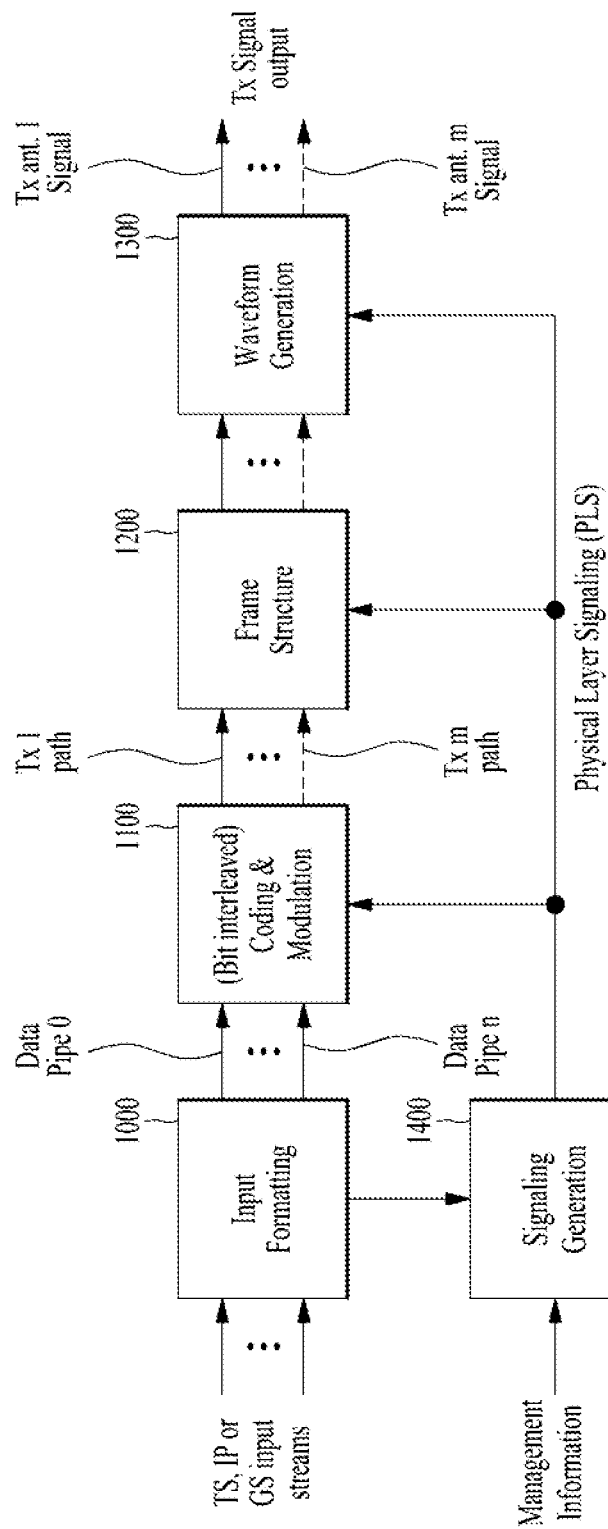
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
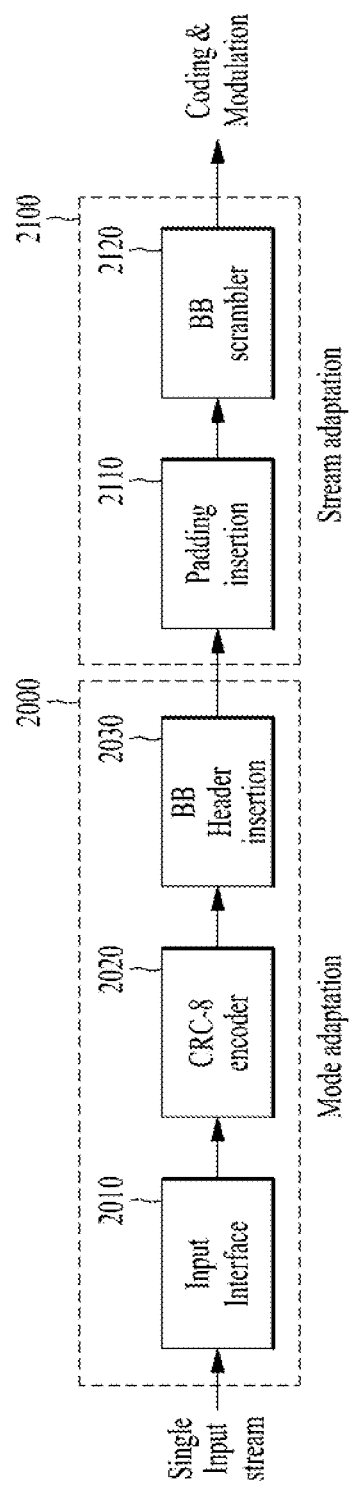
FIG. 2 illustrates an input formatting module according to an embodiment of the present invention.
Figure 3:
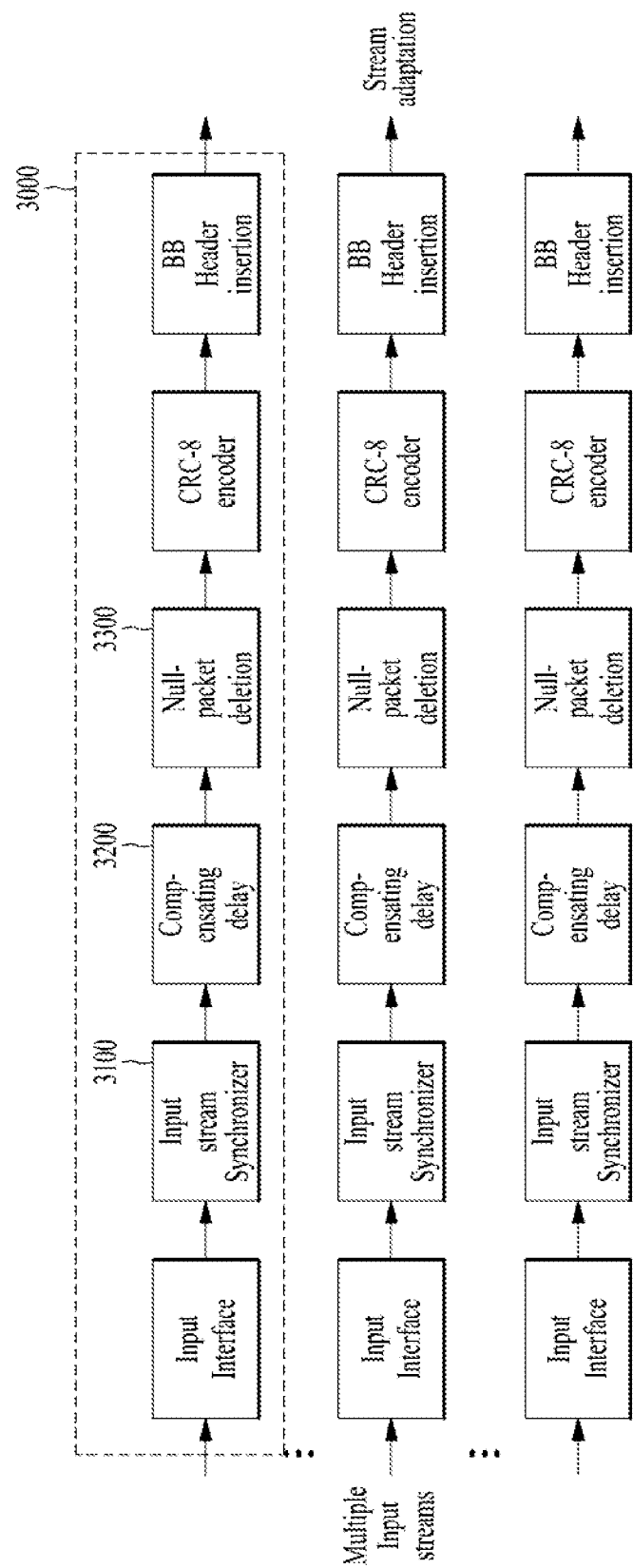
FIG. 3 illustrates an input formatting module according to another embodiment of the present invention.
Figure 4:
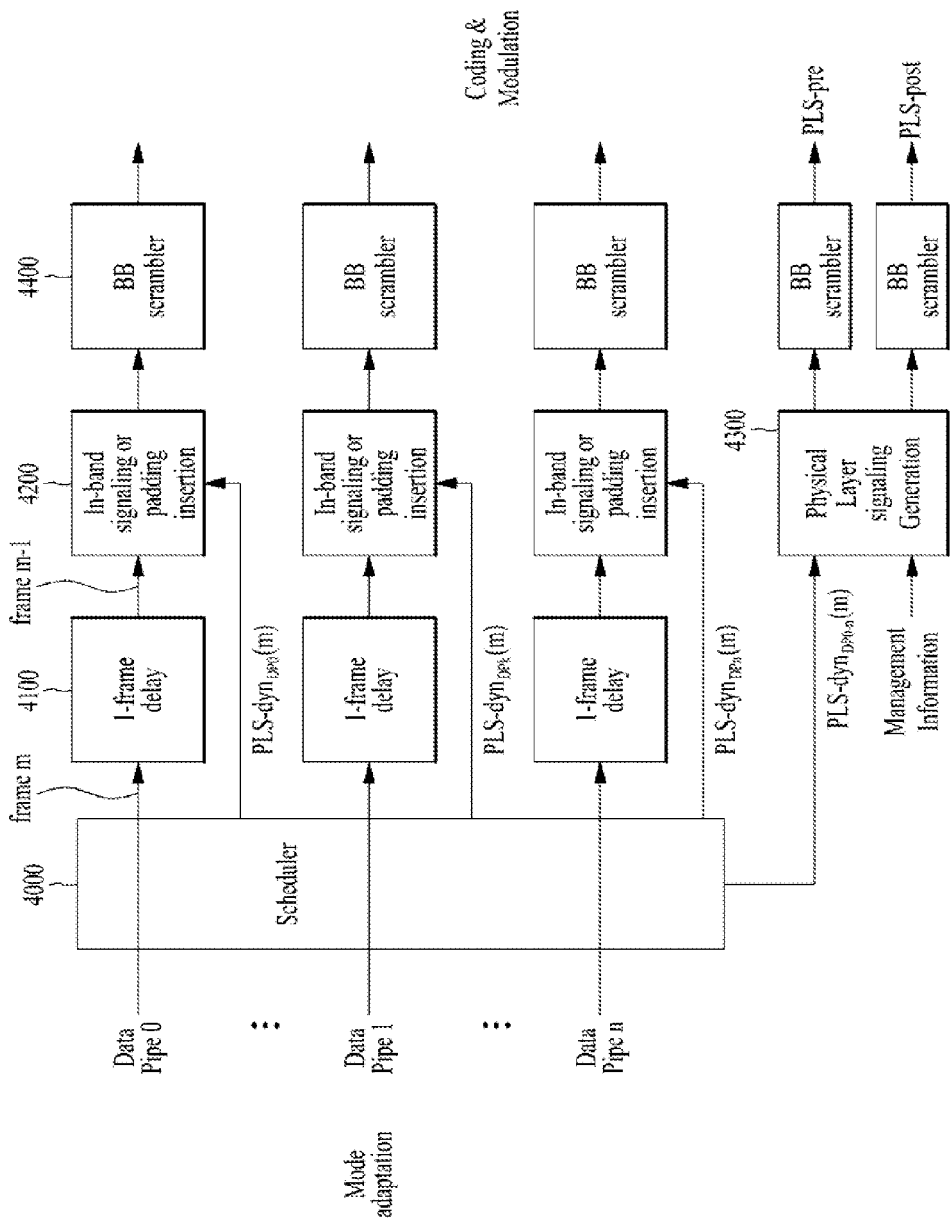
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
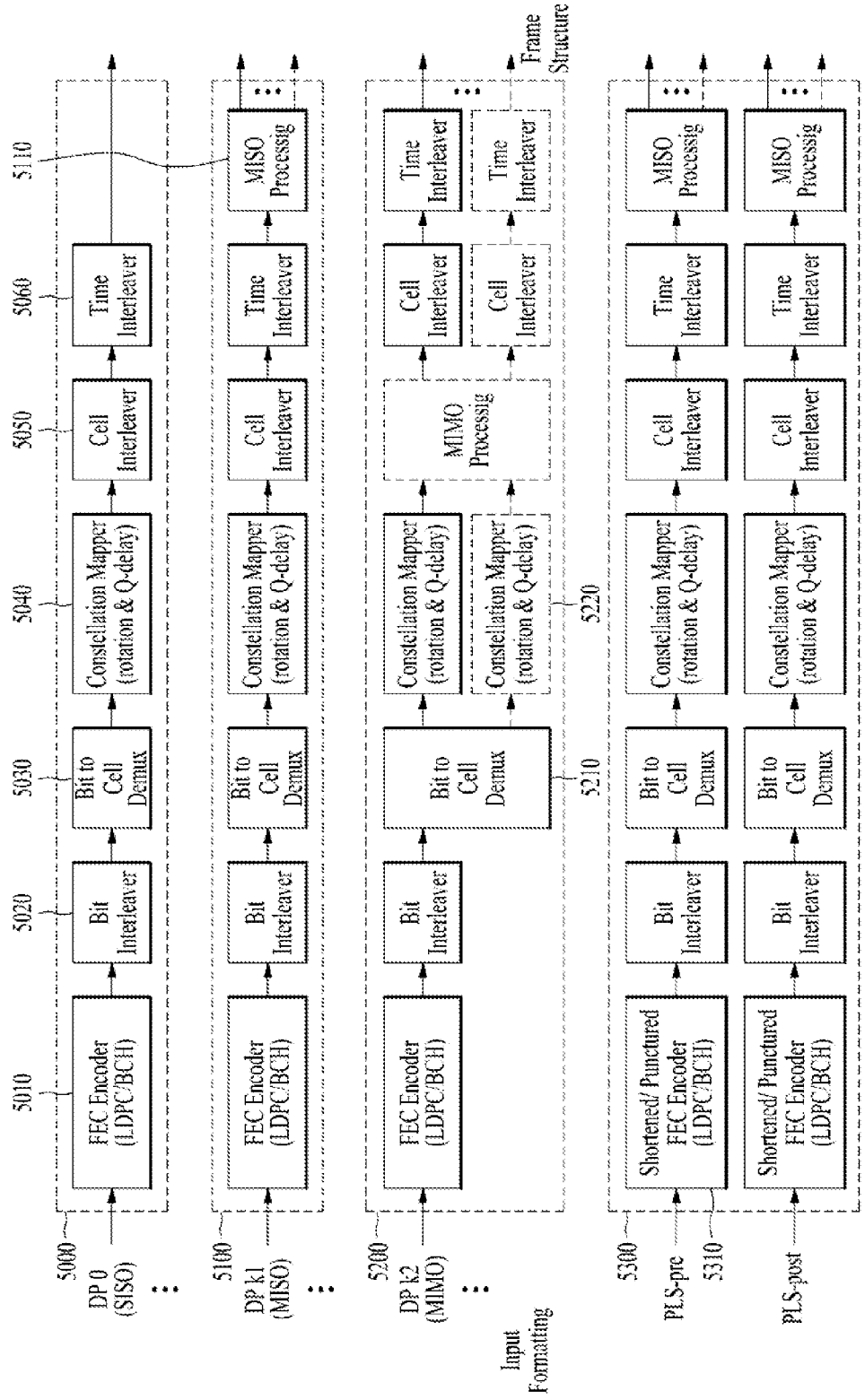
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
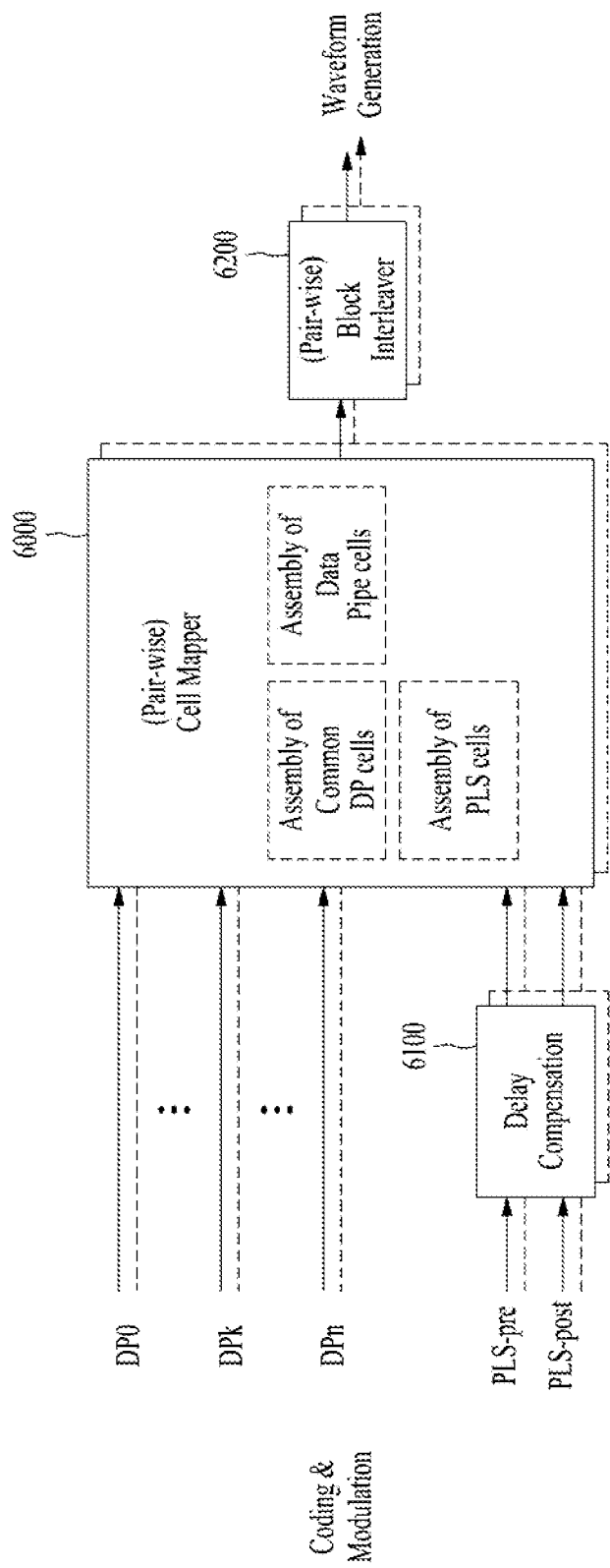
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
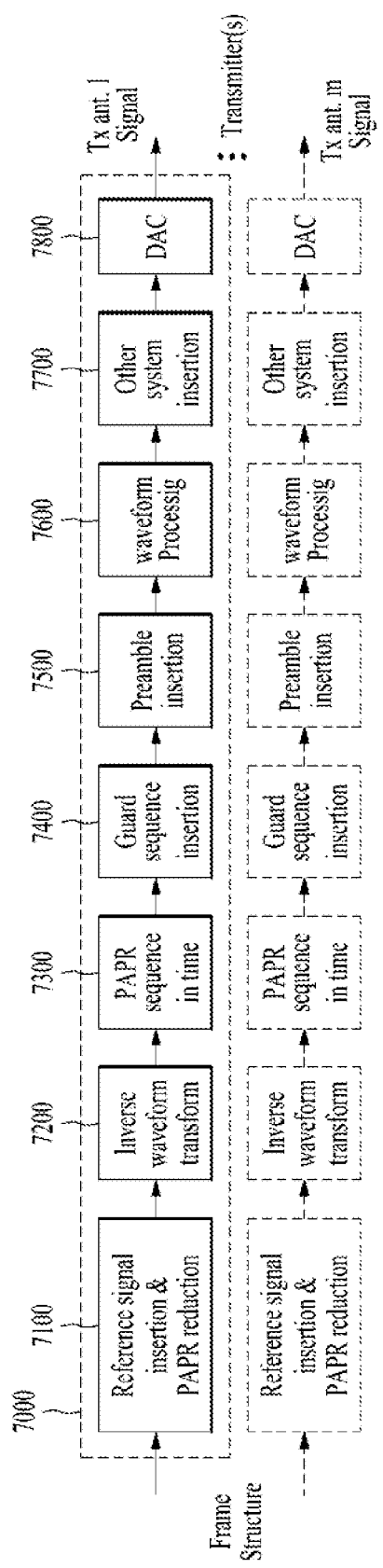
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
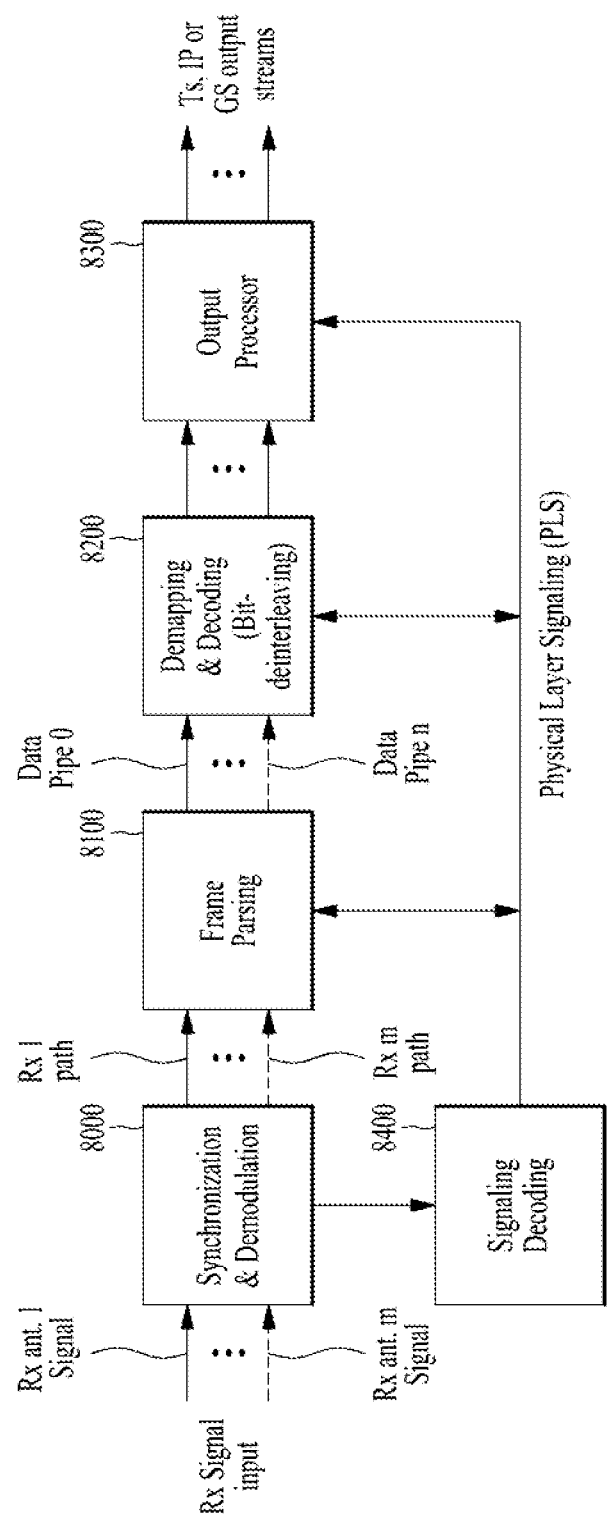
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
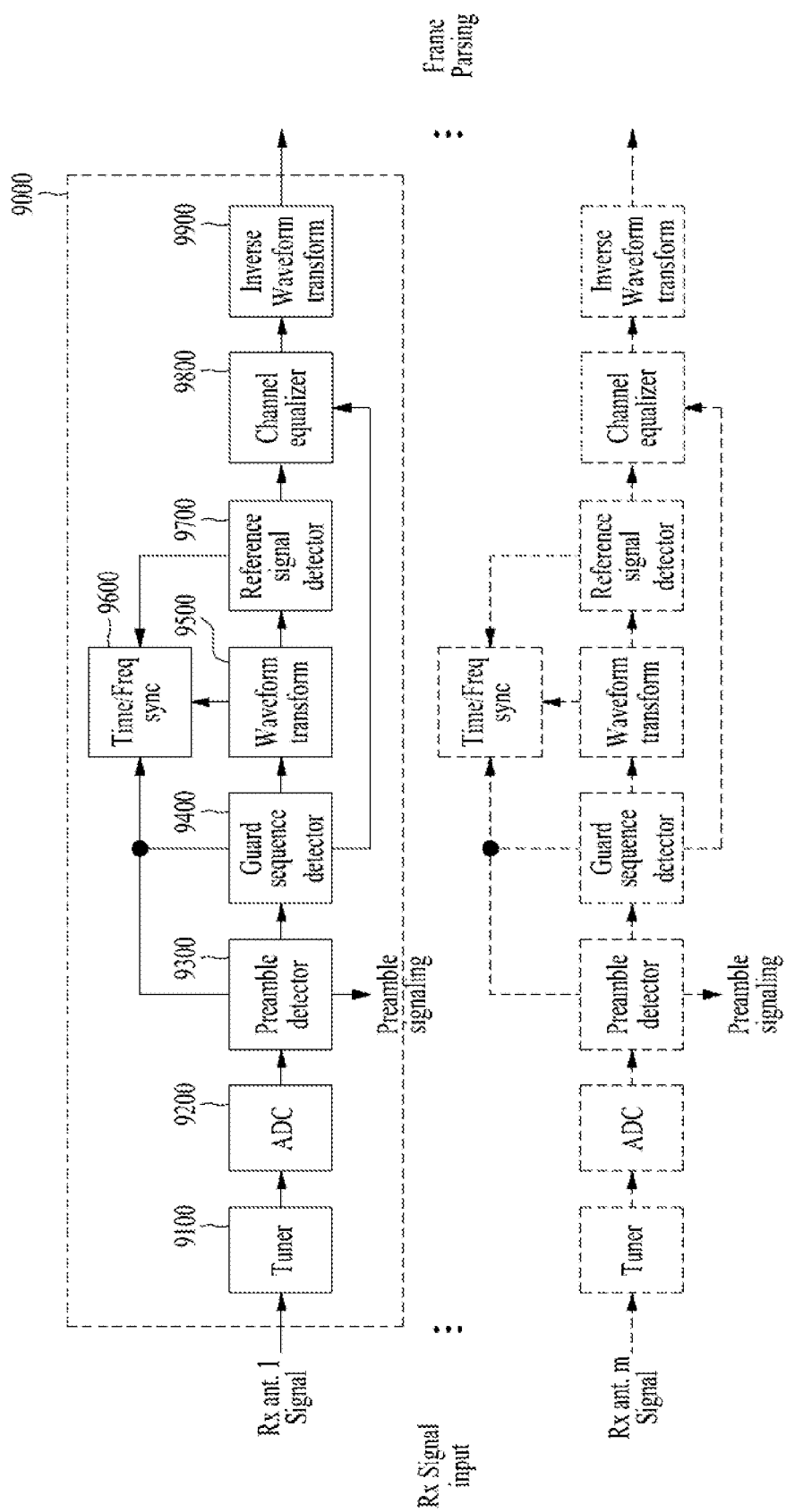
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
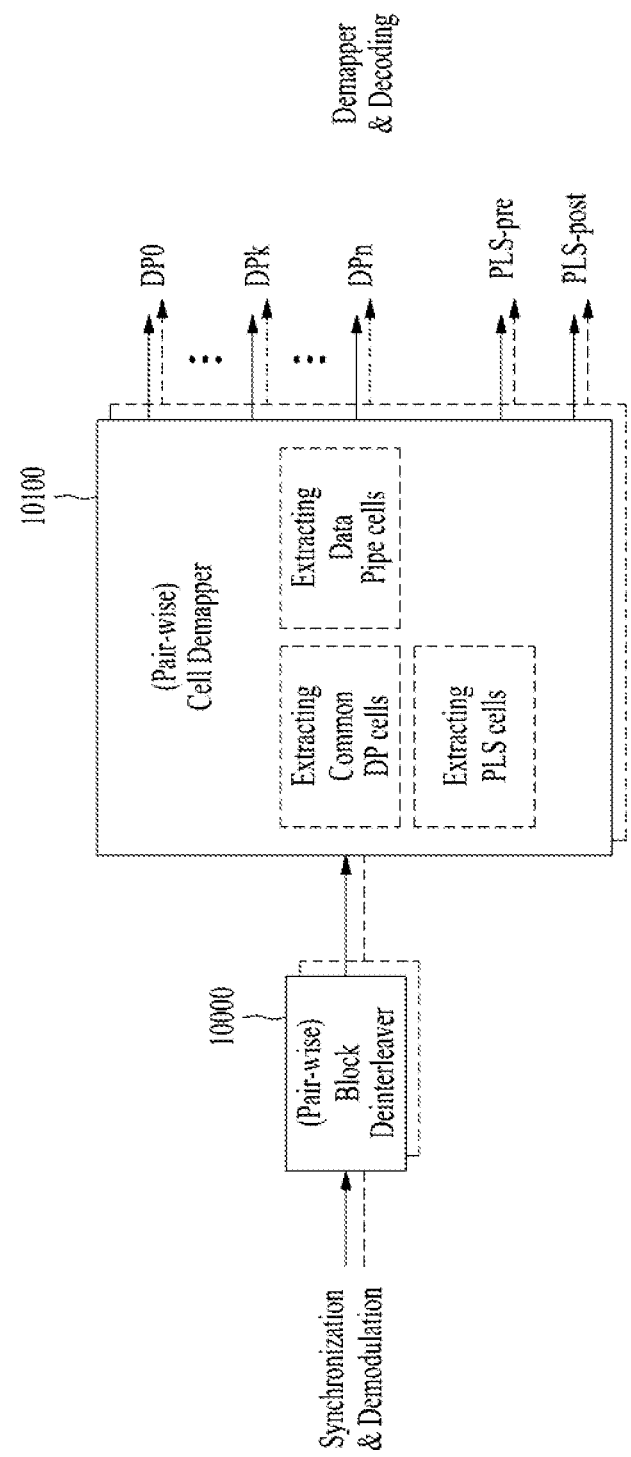
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
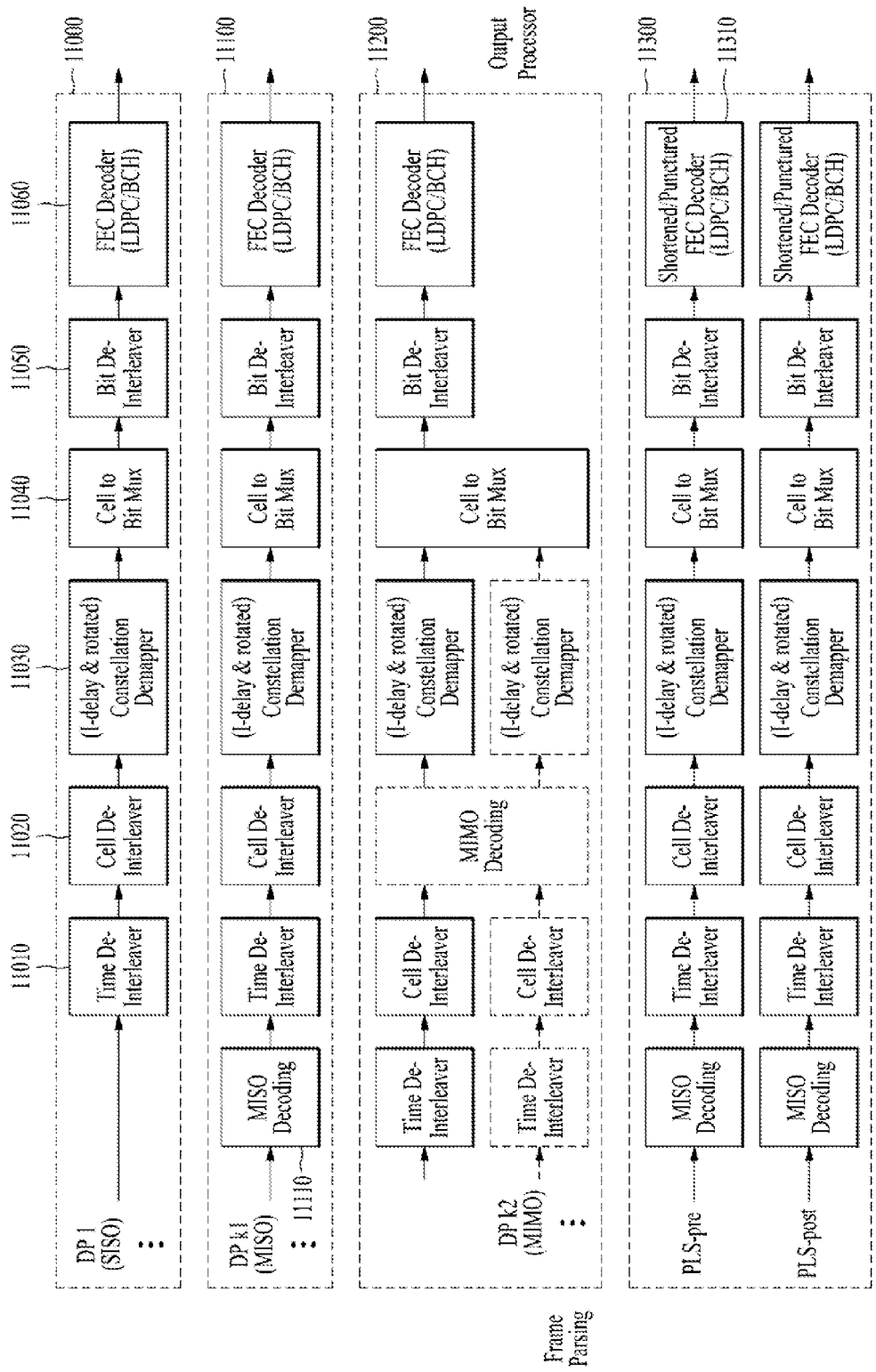
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
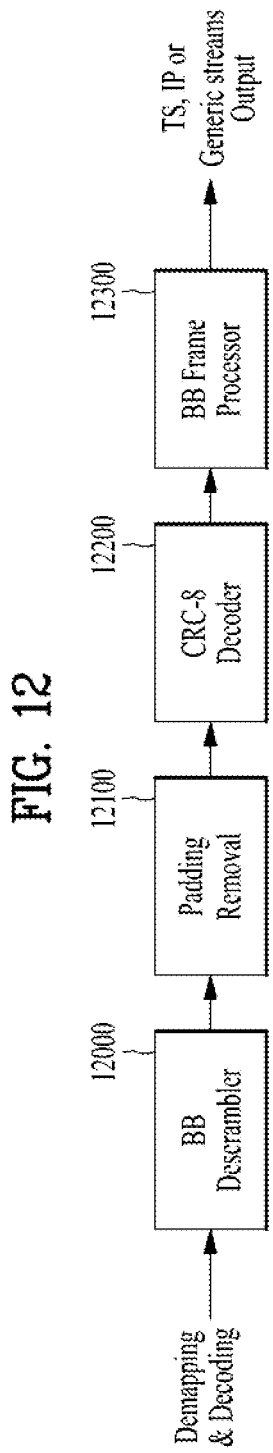
FIG. 12 illustrates an output processor according to an embodiment of the present invention.
Figure 13:
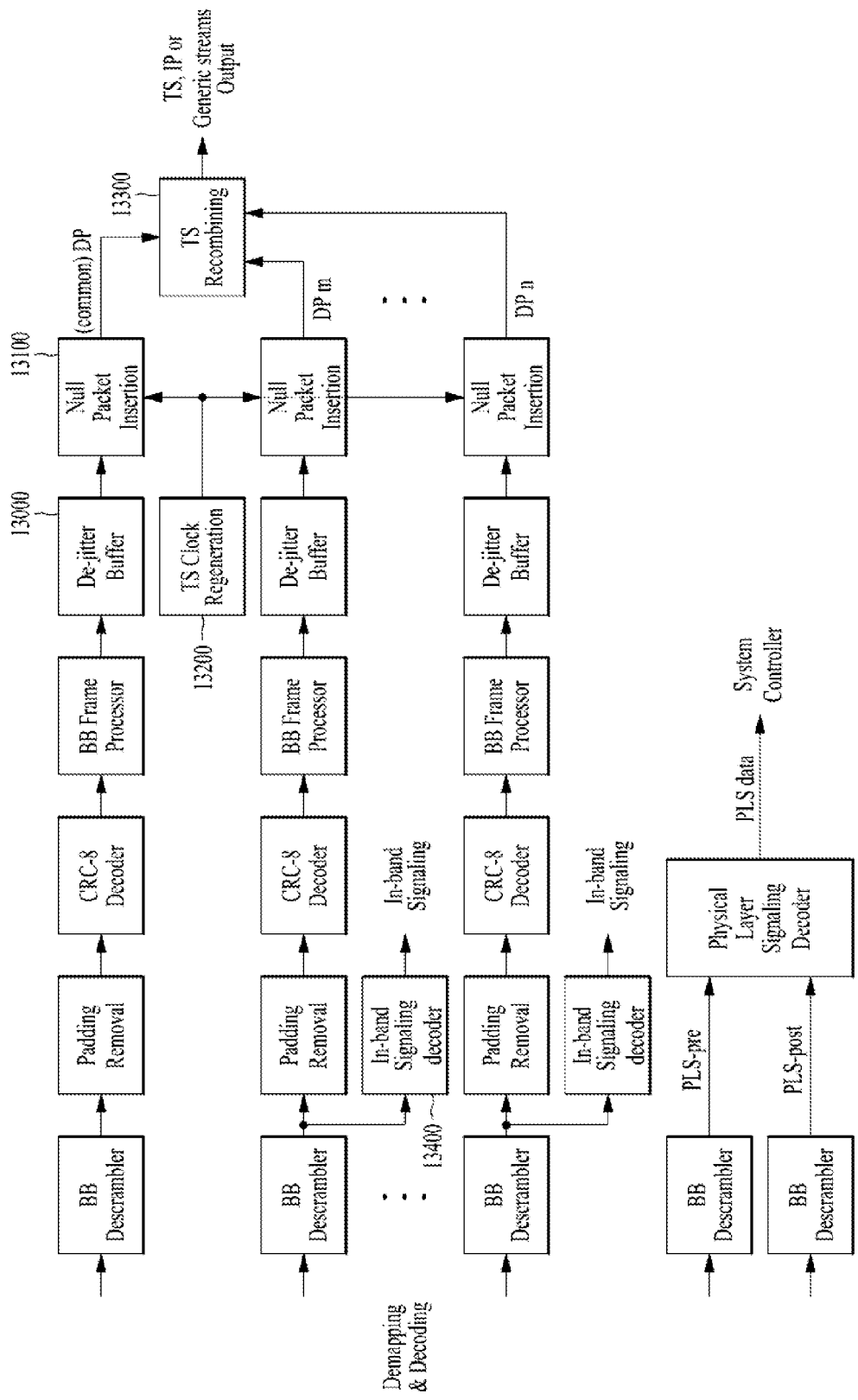
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
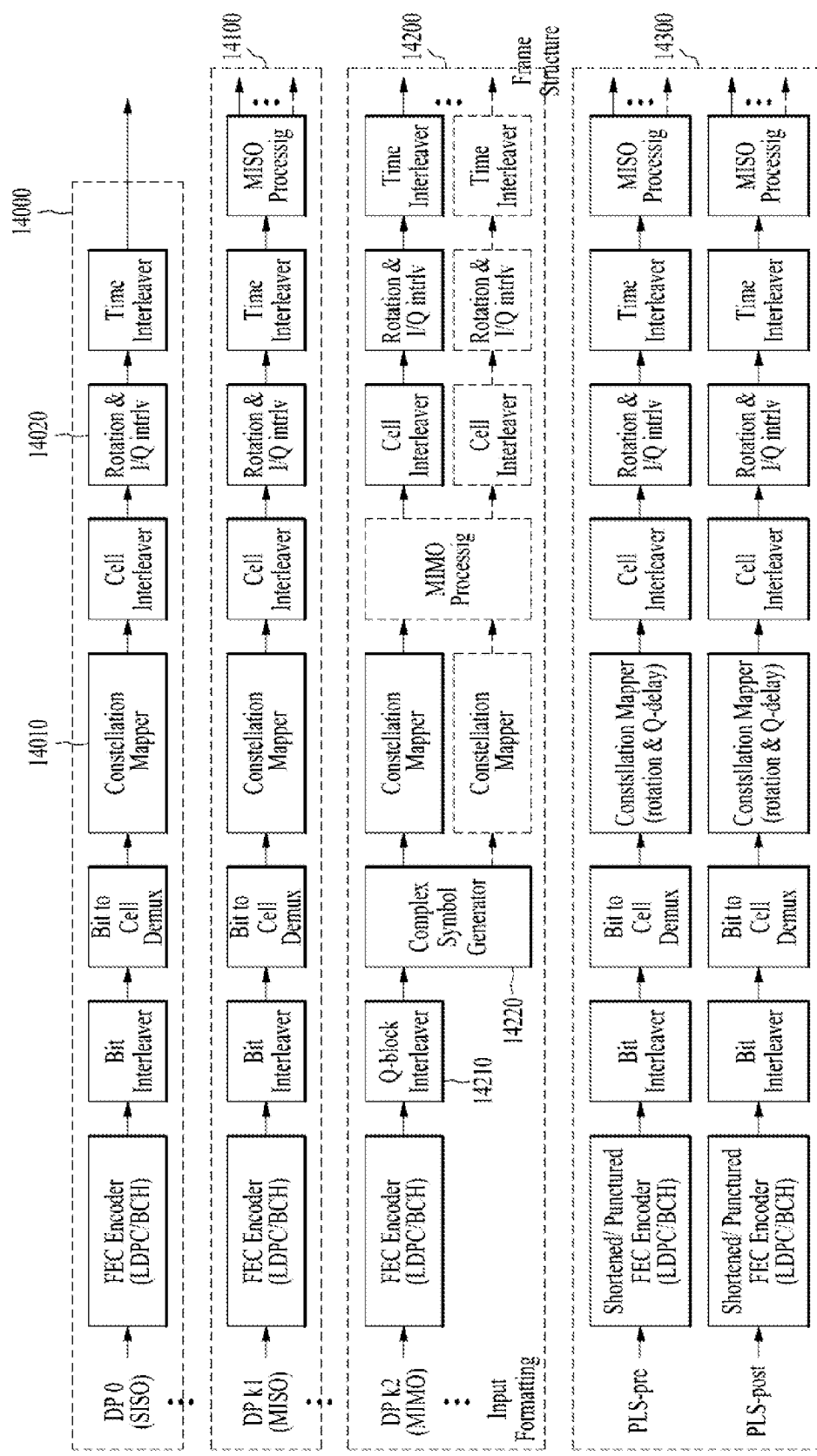
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
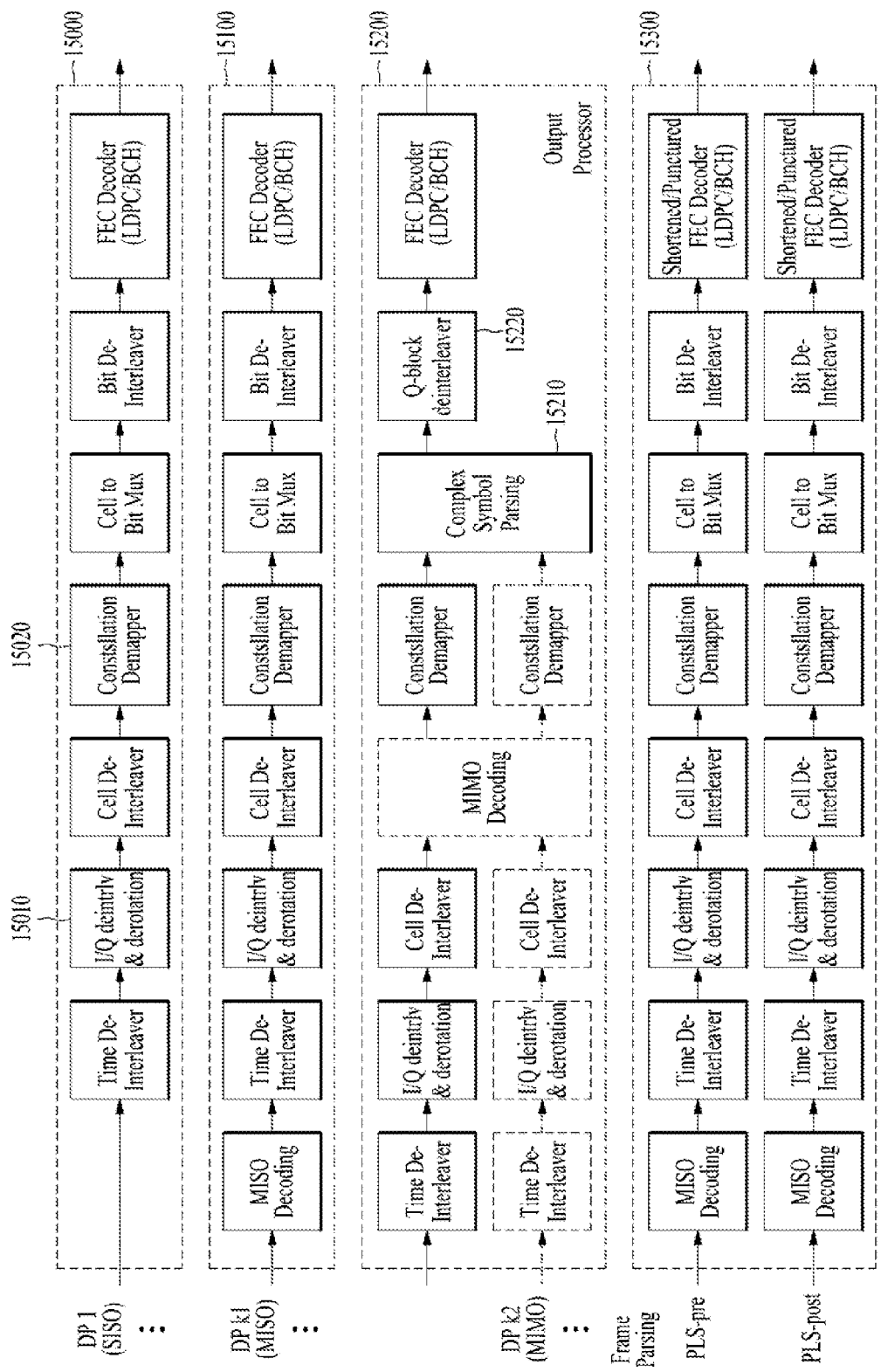
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

As described above, the waveform generation module 1300 according to an embodiment of the present invention may convert signal frames output from the frame structure module 1200 into ultimately transmittable signals. In this case, the waveform generation module 1300 according to an embodiment of the present invention may use a phase pre-distortion (PPD) method (or phase distortion). The phase pre-distortion method according to an embodiment of the present invention may be also referred to as a distributed MISO scheme or 2D-eSFN. In addition, the present invention assumes that input signals of the waveform generation block 1300 are the same.

The system according to the present invention supports the SFN (Single Frequency Network) network, where distributed MISO scheme is optionally used to support very robust transmission mode. The 2D-eSFN is a distributed MISO scheme that uses multiple TX antennas, each of which is located in the different transmitter site in the SFN network.

In the SFN configuration, the 2D-eSFN processing independently distorts the phase of the signals transmitted from multiple transmitters, in order to create both time and frequency diversity. Hence, burst errors due to low flat fading or deep-fading for a long time can be mitigated.

According to the phase pre-distortion method of the present invention, the performance of channel estimation by a broadcast signal reception apparatus may not deteriorate and gain distortion of a transmission signal may not be caused and thus the loss of transmission capacity due to the gain distortion may be minimized.

In addition, the phase pre-distortion method of the present invention may be applied independently to a plurality of TX antennas as described above and thus a diversity gain may be achieved. Further, since the broadcast signal reception apparatus does not need to process phase pre-distortion, additional complexity is not required to design the broadcast signal reception apparatus.

Figure 16:
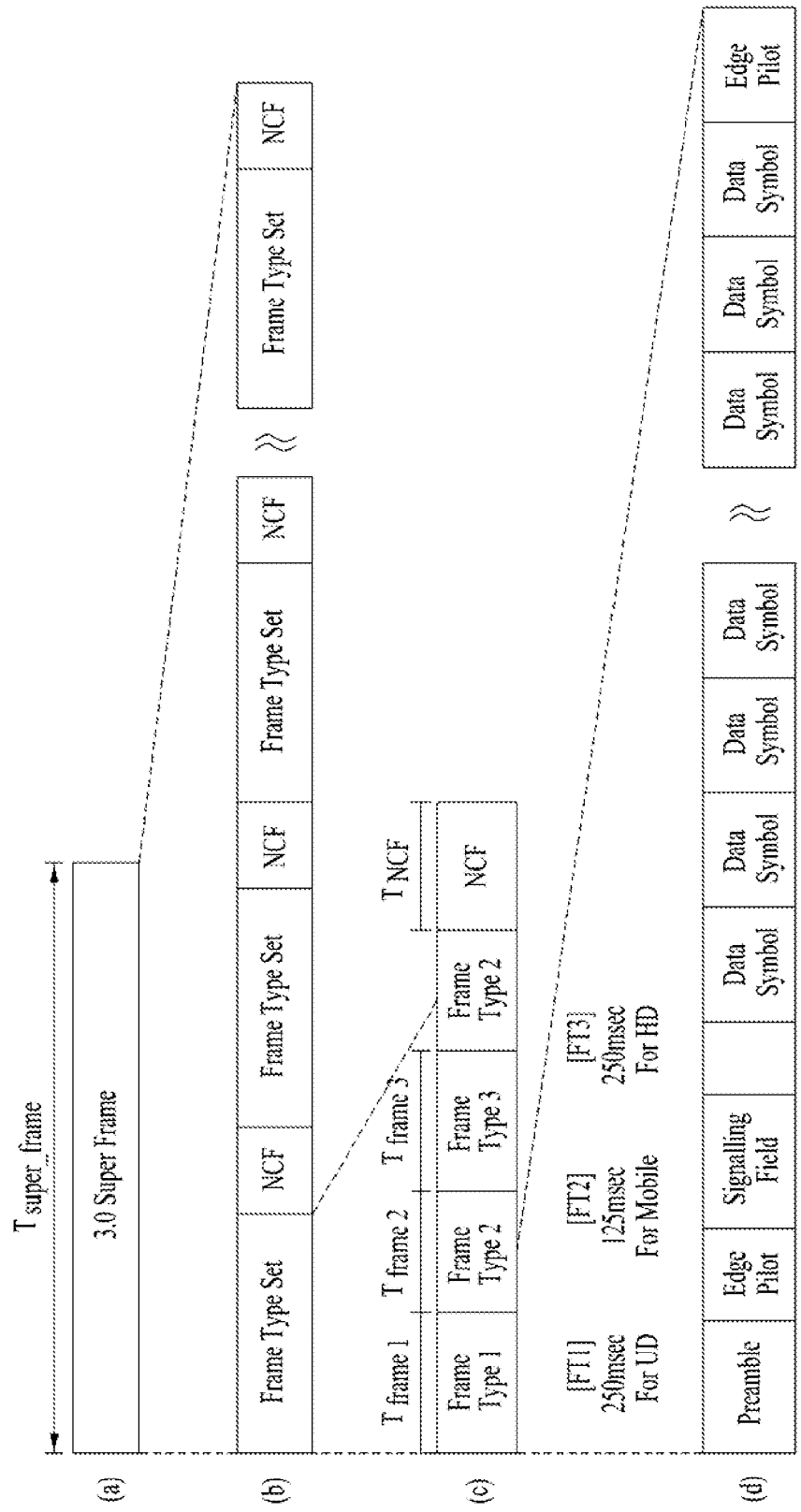
FIG. 16 illustrates a frame structure of a broadcast system according to an embodiment of the present invention.

FIG. 16 illustrates a frame structure of a broadcast system according to an embodiment of the present invention.

A cell mapper included in the aforementioned frame structure module may arrange cells transmitting input DP data processed according to SISO, MISO or MIMO, cells transmitting common DP and cells transmitting PLS data in a signal frame according to scheduling information. Then, generated signal frames may be continuously transmitted.

A broadcast signal transmission apparatus and method according to an embodiment of the present invention can multiplex different signals of a broadcast transmission/reception system in the same RF channel and transmit the multiplexed signals and a broadcast signal reception apparatus and method according to an embodiment of the present invention can process the signals. Accordingly, the present invention can provide a flexible broadcast transmission/reception system.

The broadcast signal transmission apparatus according to an embodiment of the present invention can continuously transmit a plurality of superframes carrying data related to a broadcast service.

FIG. 16(a) illustrates a superframe according to an embodiment of the present invention. The duration of the superframe can be represented by Tsuper_frame. As shown in FIG. 16(b), the superframe may include a plurality of frame type sets and non-compatible frames (NCFs). A signal frame according to an embodiment of the present invention is a TDM (Time Division Multiplexing) signal frame at a physical layer, generated in the aforementioned frame structure module, and the NCF is a frame that can be used for new broadcast service systems in future.

The superframe according to an embodiment of the present invention may include 8 frame type sets. A frame type set may be referred to as a frame repetition unit (FRU). The FRU is a basic multiplexing unit for TDM of a signal frame.

FIG. 16(c) illustrates a configuration of the frame type set according to an embodiment of the present invention. Each frame type set may include a plurality of frames.

Signal frames according to an embodiment of the present invention can transmit different services. Each signal frame according to an embodiment of the present invention transmits one of UD (Ultra high Definition) service, mobile service or HD (High Definition) service. Signal frames have different durations Tframe1, Tframe2, and Tframe3 depending on transmitted services. As shown in FIG. 16, a signal frame transmitting UD service may be referred to as frame type 1 having a duration of 250 msec. A signal frame transmitting mobile service may be referred to as frame type 2 having a duration of 125 msec. A signal frame transmitting HD service may be referred to as frame type 3 having a duration of 250 msec.

The names of signal frames, types of services transmitted by the signal frames and durations of the signal frames, suggested in the present invention, are exemplary and may be changed according to designer.

The signal frame according to an embodiment of the present invention may transmit data for one of a base profile, handheld profile and advanced profile. That is, data corresponding to each profile can be transmitted on a signal frame basis. The broadcast signal reception apparatus may identify each profile according to a received signal frame and obtain a broadcast service suitable therefor. One frame type set may include a plurality of signal frames corresponding to the same profile. This may be changed according to designer.

FIG. 16(d) illustrates a configuration of each signal frame. Each signal frame may include a preamble, edge pilot, signaling field and a plurality of data symbols. This configuration may be changed according to designer.

The preamble is located at the head of the signal frame and may carry basic transmission parameters for identifying a broadcast system and type of each signal frame, information for synchronization of the time domain and frequency domain, information related to EAS (Emergency Alert System) messages (or EAC messages) and the like. The broadcast signal reception apparatus according to an embodiment of the present invention can perform frame synchronization since the broadcast signal reception apparatus can detect the preamble to acquire the frame start point.

The preamble according to an embodiment of the present invention is a basic transmission parameter and may include type of profile transmitted through a signal frame, FFT size, guard interval length, pilot pattern, etc.

Accordingly, the broadcast signal reception apparatus according to an embodiment of the present invention can identify the corresponding broadcast system and frame type by detecting the preamble of the signal frame first and selectively receive and decode a broadcast signal corresponding to receiver type.

That is, even when a broadcast signal in which frames including various broadcast services such as UHD, mobile and MISO/MIMSO services are multiplexed is received through the one RF, the broadcast signal reception apparatus according to an embodiment of the present invention can obtain information of the corresponding frames by decoding preambles of the frames.

Edge symbols may be located after the preamble of each signal frame or at the end of each signal frame. Names, positions and number of edge symbols may be changed according to designer. Edge symbols may be inserted into each signal frame to support freedom of preamble design and multiplexing of signal frames of different types. An edge symbol may include a larger number of pilots than a data symbol to enable frequency-only interpolation and time interpolation between data symbols. Accordingly, a pilot pattern of the edge symbol has higher density than a data symbol pilot pattern.

The signaling field is a field for transmitting the aforementioned PLS data and may include additional system information (network topology/configuration, PAPR use and the like) and frame type UD/configuration information and information necessary to extract and decode each DP.

A data symbol is used to transmit DP data. The aforementioned cell mapper can arrange a plurality of DPs in the data symbol.

The present invention suggests a normal preamble and a robust preamble as a preamble structure in the time domain and frequency domain and a method for signaling an EAS related signal through a preamble.

The broadcast signal transmission apparatus according to an embodiment of the present invention may insert a preamble structure depending on a target SNR of a service to be provided into a signal frame. The robust preamble according to an embodiment of the present invention, which will be described later, has excellent detection performance even in a low SNR environment but may generate unnecessary overhead in a receiver since an FFT size and guard interval increase. Accordingly, the broadcast signal transmission apparatus according to an embodiment of the present invention can insert the normal preamble into a signal frame transmitted in a high SNR environment and insert the robust preamble into a signal frame transmitted in a low SNR environment.

The above-described three profiles can be defined as broadcast signal transmission/reception scenarios for providing services corresponding to different reception environments. Accordingly, the broadcast signal transmission apparatus according to an embodiment of the present invention can insert the normal preamble or the robust preamble according to a profile transmitted through a signal frame.

A description will be given of generation processes, structures and signaling information of the normal preamble and the robust preamble according to an embodiment of the present invention.

Figure 17:
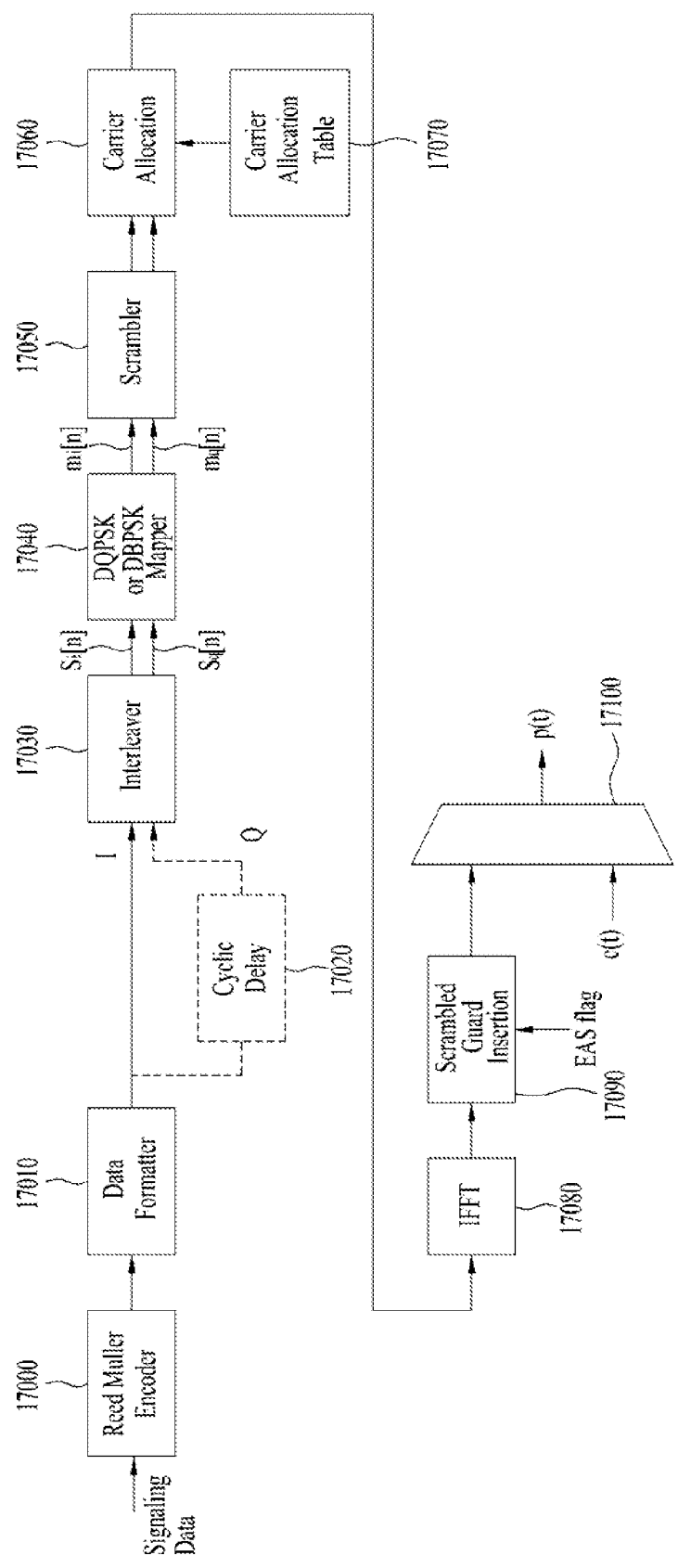
FIG. 17 illustrates a preamble insertion block according to an embodiment of the present invention.

FIG. 17 illustrates a preamble insertion block according to an embodiment of the present invention.

FIG. 17 shows another embodiment of the preamble insertion block 7500 described with reference to FIG. 7. As shown in FIG. 17, the preamble insertion block according to an embodiment of the present invention may include a Reed Muller encoder 17000, a data formatter 17010, a cyclic delay block 17020, an interleaver 17030, a DQPSK (Differential Quadrature Phase Shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified according to designer or may not be included in the preamble insertion block. A description will be given of operation of each block.

The Reed Muller encoder 17000 may receive signaling information to be transmitted through a preamble and perform Reed Muller encoding of the input signaling information. When Reed Muller encoding is performed, signaling performance can be improved over conventional signaling using an orthogonal sequence.

The data formatter 17010 may receive bits of the Reed-Muller-encoded signaling information and perform formatting for repeating and arranging the input bits.

The DQPSK/DBPSK mapper 17040 may map the formatted signaling information bits according to DBPSK or DQPSK and output the mapped signaling information.

When the DQPSK/DBPSK mapper 17040 maps the formatted signaling information bits according to DBPSK, the operation of the cyclic delay block 17020 may be skipped. The interleaver 17030 may receive the formatted signaling information bits, frequency-interleave the formatted signaling information bits and output interleaved data. In this case, the operation of the interleaver 17030 may be omitted according to designer.

When the DQPSK/DBPSK mapper 17040 maps the formatted signaling information bits according to DQPSK, the data formatter 17010 may output the formatted signaling information bits to the interleaver 17030 through a path I shown in FIG. 17. The cyclic delay block 17020 may cyclic-delay the formatted signaling information bits output from the data formatter 17010 and then output the delayed signaling information bits to the interleaver 17030 through a path Q shown in FIG. 17. When cyclic Q-delay is performed, performance in a frequency selective fading channel is improved.

The interleaver 17030 may perform frequency interleaving on the signaling information and cyclic Q-delayed signal information, input through the path I and path Q, and output interleaved information. In this case, the operation of the interleaver 17030 may be omitted according to designer.

The scrambler 17050 may receive the mapped signaling information output from the DQPSK/DBPSK mapper 17040 and multiply the signaling information by a scrambling sequence.

The carrier allocation block 17060 may arrange the signaling information processed by the scrambler 17050 in a predetermined carrier position using position information output from the carrier allocation table block 17070.

The IFFT block 17080 may transform carriers output from the carrier allocation block 17060 into an OFDM signal of the time domain.

The scrambled guard insertion block 17090 may insert a scrambled guard interval into the OFDM signal to generate a preamble. The scrambled guard insertion block 17090 according to an embodiment of the present invention may generate the scrambled guard interval by multiplying a guard interval in the form of a cyclic prefix by a scrambling sequence. The scrambled guard interval will be described later in detail. In the present invention, the scrambled guard interval can be referred to as a scrambled GI.

The scrambled guard insertion block 17090 may select the scrambling sequence according to whether an EAS message is inserted. The scrambled guard insertion block 17090 may determine whether to insert the EAS message using EAS flag information that indicates whether the EAS message is present in the preamble.

The multiplexing block 17100 may multiplex the output of the scrambled guard insertion block 17090 and a signal c(t) output from the guard sequence insertion block 7400 described with reference to FIG. 7 to output an output signal p(t). The output signal p(t) may be input to the waveform processing block 7600 shown in FIG. 7.

The preamble insertion block according to an embodiment of the present invention can improve signaling performance over conventional signaling using an orthogonal sequence by performing Reed Muller encoding and enhance performance in a frequency selective fading channel by performing cyclic Q-delay.

FIG. 18 shows mathematical expressions representing relationships between input information and output information or mapping rules of the DQPSK/DBPSK mapper 17040 according to an embodiment of the present invention.

FIG. 18(a) shows mathematical expressions representing a relationship between input information and output information or a mapping rule when the DQPSK/DBPSK mapper 17040 according to an embodiment of the present invention maps the input signaling information according to DBPSK.

FIG. 18(b) shows mathematical expressions representing a relationship between input information and output information or a mapping rule when the DQPSK/DBPSK mapper 17040 according to an embodiment of the present invention maps the input signaling information according to DQPSK.

As shown in FIG. 18, the input information of the DQPSK/DBPSK mapper 17040 may be represented as $si[n]$ and $sq[n]$ and the output information of the DQPSK/DBPSK mapper 17040 may be represented as $mi[n]$ and $mq[n]$ for convenience of description.

FIG. 19 illustrates preamble structures according to an embodiment of the present invention.

FIG. 19(a) shows a structure of the normal preamble and FIG. 19(b) shows a structure of the robust preamble.

In the structure of the robust preamble according to an embodiment of the present invention, the normal preamble is repeated. Specifically, in the robust preamble structure according to an embodiment of the present invention, the normal preamble is repeated twice. The robust preamble according to an embodiment of the present invention is designed to detect and decode the preamble symbol under harsh channel conditions like mobile reception.

The normal preamble shown in FIG. 19(a) may be generated by the preamble insertion block shown in FIG. 17. The robust preamble shown in FIG. 19(b) may be generated by a preamble insertion block according to an embodiment of the present invention, shown in FIG. 20 or 21, which will be described later.

(a) The normal preamble according to an embodiment of the present invention may include a scrambled GI region and an OFDM data region. The scrambled GI region of the preamble according to an embodiment of the present invention may be a scrambled cyclic postfix or a scrambled cyclic prefix. The scrambled cyclic postfix may be located after an OFDM symbol, distinguished from a scrambled prefix and may be generated through the same process as used to generate the scrambled cyclic prefix, which will be described later. The process of generating the scrambled cyclic postfix may be modified according to designer.

The scrambled GI region shown in FIG. 19 may be generated by scrambling some or all OFDM symbols and used as a guard interval. The scrambled GI and OFDM data of the normal preamble according to an embodiment of the present invention may have the same length. In FIG. 19, the scrambled GI and OFDM data have a length of N and the normal preamble has a length of 2N. N, which relates to the length of the preamble according to an embodiment of the present invention, may refer to an FFT size.

The preamble according to an embodiment of the present invention is composed of 3 signaling fields, namely S1, S2 and S3. Each signaling field contains 7 signaling bits, and the preamble carries 21 signaling bits in total. Each signaling field is encoded with a first-order Reed Muller (64, 7) code.

The signaling fields according to an embodiment of the present invention may include the aforementioned signaling information. The signaling fields will be described in detail later.

The broadcast signal reception apparatus according to an embodiment of the present invention can detect a preamble through guard interval correlation using a guard interval in the form of a cyclic prefix even when frequency synchronization cannot be performed.

In addition, the guard interval in the form of a scrambled cyclic prefix according to an embodiment of the present invention can be generated by multiplying (or combining) an OFDM symbol by (or with) a scrambling sequence (or sequence). Furthermore, the guard interval in the form of a scrambled cyclic prefix according to an embodiment of the present invention can be generated by scrambling the OFDM symbol and the scrambling sequence. The scrambling sequence according to an embodiment of the present invention can be any type of signal according to designer.

The method of generating the guard interval in the form of a scrambled cyclic prefix according to an embodiment of the present invention has the following advantages.

Firstly, the preamble can be easily detected by discriminating the preamble from the normal OFDM symbol. The guard interval in the form of a scrambled cyclic prefix is generated through scrambling using the scrambling sequence, distinguished from the normal OFDM symbol, as described above. In this case, when the broadcast signal reception apparatus according to an embodiment of the present invention performs guard interval correlation, the preamble can be easily detected since a correlation peak according to the normal OFDM symbol is not generated and only a correlation peak according to the preamble is generated.

Secondly, when the guard interval in the form of a scrambled cyclic prefix according to an embodiment of the present invention is used, dangerous delay can be prevented. For example, when multipath interference having a delay corresponding to an OFDM symbol period Tu exists, since a correlation value according to multiple paths is present all the time when the broadcast signal reception apparatus performs guard interval correlation, preamble detection performance may be deteriorated. However, when the broadcast signal reception apparatus according to an embodiment of the present invention performs guard interval correlation, the preamble can be detected without being affected by a correlation value according to multiple paths since only a peak according to the scrambled cyclic prefix is generated, as described above.

Finally, influence of continuous wave (CW) interference can be prevented. When a received signal includes CW interference, a DC component according to CW is present all the time during guard interval correlation performed by the broadcast signal reception apparatus and thus signal detection performance and synchronization performance of the broadcast signal reception apparatus may be deteriorated. However, when the guard interval in the form of a scrambled cyclic prefix according to an embodiment of the present invention is used, the influence of CW can be prevented since the DC component according to CW is averaged out by the scrambling sequence.

(b) The robust preamble according to an embodiment of the present invention has repeated normal preambles, as shown in FIG. 19. Accordingly, the robust preamble may include the scrambled GI region and the OFDM data region.

The robust preamble is a kind of repetition of the normal preamble, and carries the same signaling fields S1, S2 and S3 with a different signaling scrambler sequence (SSS).

The first half of the robust preamble, shown in FIG. 19(b), is exactly the same as the normal preamble. The second half of the robust preamble is a simple variation of the normal preamble where the difference arises from the sequence SSS applied in the frequency domain. Accordingly, the second half of the robust preamble includes the same information as that of the normal preamble but may have different data in the frequency domain. In addition, OFDM data B has the same signaling data as OFDM data A but may have a different output waveform in the time domain. That is, while inputs of the Reed Muller encoder 17000 for respectively generating the first half of the robust preamble and the second half of the robust preamble are identical, the IFFT block 17080 may output different waveforms.

The doubled length of the robust preamble according to an embodiment of the present invention improves the detection performance in the time domain, and the repetition of the signaling fields improves the decoding performance for the preamble signaling data. The generation process of the robust preamble symbol is shown in FIG. 19. The detailed functional steps are described in the following description.

The signaling fields will be described in detail with reference to FIGS. 24, 25 and 26 and the robust preamble generation process will be described in detail with reference to FIGS. 20 and 21.

The robust preamble according to an embodiment of the present invention can be detected even by a normal reception apparatus in an environment having a high SNR (Signal to Noise Ratio) since the robust preamble includes the normal preamble structure. In an environment having a low SNR, the robust preamble can be detected using the repeated structure. In FIG. 19(b), the robust preamble has a length of 4N.

When the broadcast signal reception apparatus according to an embodiment of the present invention receives a signal frame including the robust preamble, the broadcast signal reception apparatus can stably detect the preamble to decode signaling information even in a low SNR situation.

Figure 20:
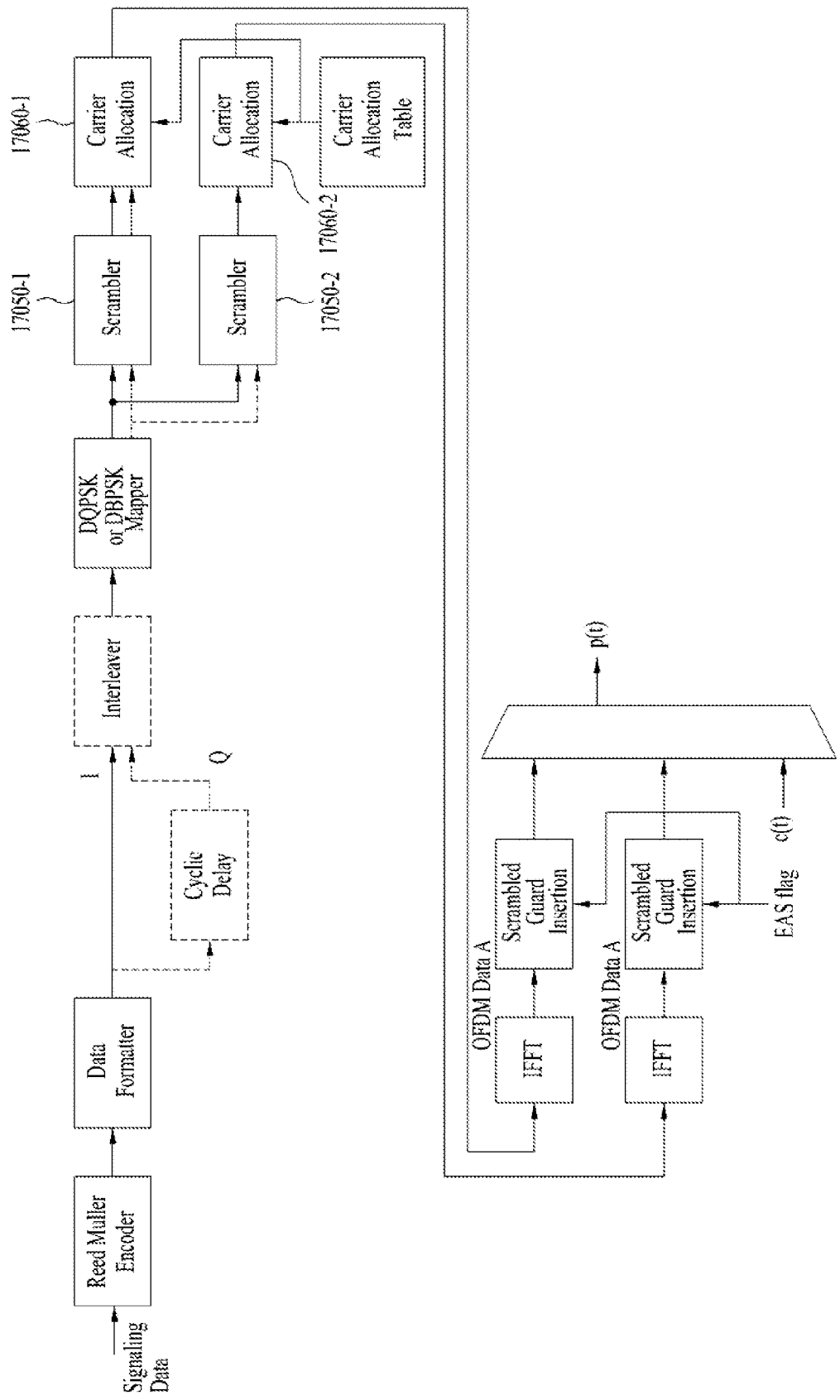
FIG. 20 illustrates a preamble insertion block according to an embodiment of the present invention.
Figure 21:
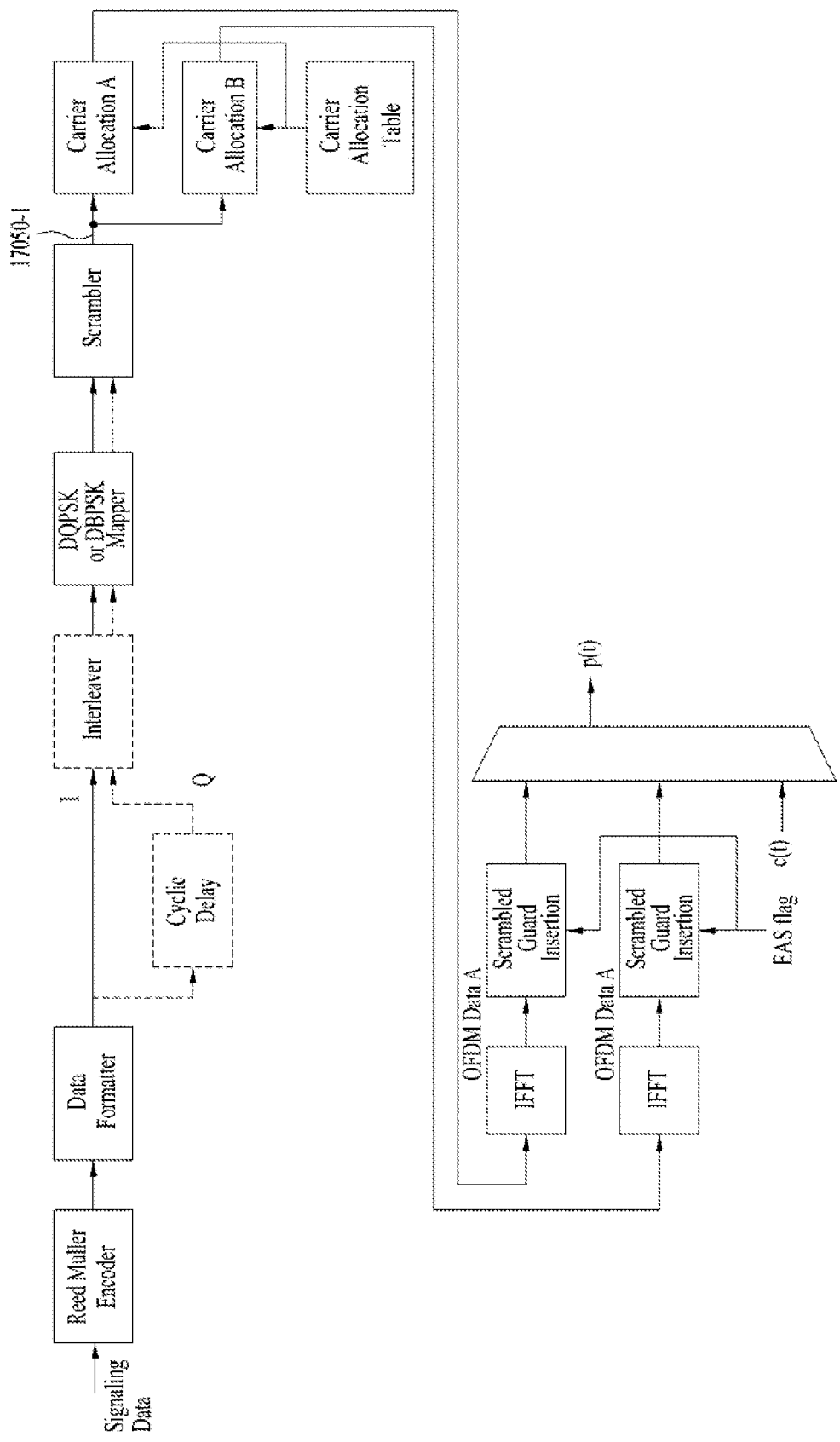
FIG. 21 illustrates a preamble insertion block according to an embodiment of the present invention.

FIGS. 20 and 21 illustrate two methods for generating the robust preamble according to an embodiment of the present invention. The robust preamble structure according to an embodiment of the present invention improves the detection performance of signals of a broadcast reception apparatus. The robust preamble may include structure of normal preamble. The robust preamble may additionally include repeated signaling data same as the normal preamble. In this case, the signals of a broadcast transmission apparatus according to an embodiment of the present invention can design differently repeated signaling data of waveform which is included the robust preamble in time domain than signaling data of waveform which is included the normal preamble in time domain. A robust preamble insertion block illustrated in FIG. 20 may generate the robust preamble by multiplying signaling information of the preamble by different scrambling sequences in scramblers to output multiple pieces of scrambled signaling information and allocating the multiple pieces of scrambled signaling information multiplied by the scrambling sequences to OFDM symbol carriers on the basis of the same carrier allocation table.

A robust preamble insertion block illustrated in FIG. 21 may generate the robust preamble by multiplying preamble signaling information by the same scrambling sequence and allocating the preamble signaling information multiplied by the scrambling sequence to OFDM symbol carriers on the basis of different carrier allocation tables.

Detailed embodiments will now be described with reference to the figures.

FIG. 20 illustrates a preamble insertion block according to an embodiment of the present invention.

Specifically, FIG. 20 shows another embodiment of the preamble insertion block 7500 illustrated in FIG. 7. The preamble insertion block shown in FIG. 20 may generate the robust preamble. Referring to FIG. 20, the preamble insertion block according to an embodiment of the present invention may include a Reed Muller encoder 17000, a data formatter 17010, a cyclic delay block 17020, an interleaver 17030, a DQPSK (Differential Quadrature Phase shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified or may not be included in the preamble insertion block according to designer. Operations of the blocks may be the same as those of corresponding blocks shown in FIG. 17. A description will be given focusing on a difference between the robust preamble generation process and the normal preamble generation process.

As described above, the robust preamble is composed of the first half of the robust preamble and the second half of the robust preamble and the first half of the robust preamble may be the same as the normal preamble.

Robust preamble generation differs from normal preamble generation only by applying the sequence SSS in the frequency domain as described. Consequently, the Reed Muller encoder 17000, the data formatter 17010 and the DQPSK/DBPSK mapper block 17040 are shared with the normal preamble generation.

The first half of the robust preamble may be generated through the same process as used to generate the normal preamble. In FIG. 20, OFDM data A of the first half of the robust preamble may be generated by scrambling signalling data input to the Reed Muller encoder 17000 through a scrambler A block 17050-1, a carrier allocation block 17060-1 and an IFFT module, allocating the scrambled data to active carriers and transforming carriers output from the carrier allocation block 17060-1 into an OFDM signal of the time domain.

OFDM data B of the second half of the robust preamble may be generated by scrambling signalling data input to the Reed Muller encoder 17000 through a scrambler B block 17050-2, a carrier allocation block 17060-2 and an IFFT module, allocating the scrambled data to active carriers and transforming carriers output from the carrier allocation block 17060-2 into an OFDM signal of the time domain.

The carrier allocation blocks 17060-1 and 17060-2 according to an embodiment of the present invention can allocate the signaling data of the first half of the robust preamble and the signaling data of the second half of the robust preamble to carriers on the basis of the same allocation table.

Scrambled guard insertion modules may respectively scramble OFDM data A and OFDM data B respectively processed through the IFFT modules to generate scrambled GI A and scrambled GI B, thereby generating the first half of the robust preamble and the second half of the robust preamble.

FIG. 21 illustrates a preamble insertion block according to an embodiment of the present invention.

Specifically, FIG. 21 shows another embodiment of the preamble insertion block 7500 illustrated in FIG. 7. The preamble insertion block shown in FIG. 20 may generate the robust preamble. Referring to FIG. 21, the preamble insertion block according to an embodiment of the present invention may include a Reed Muller encoder 17000, a data formatter 17010, a cyclic delay block 17020, an interleaver 17030, a DQPSK (Differential Quadrature Phase shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified or may not be included in the preamble insertion block according to designer. Operations of the blocks may be the same as those of corresponding blocks shown in FIG. 17.

A description will be given focusing on a difference between the robust preamble generation process and the robust preamble generation process of FIG. 20.

The procedure of processing signaling data of the robust preamble according to an embodiment of the present invention through the Reed Muller encoder, data formatter, cyclic delay, interleaver, DQPSK/DBPSK mapper and scrambler modules may correspond to the aforementioned procedure of processing the signaling data of the normal preamble through the respective modules.

The signaling data scrambled by the scrambler module may be input to a carrier allocation A module and a carrier allocation B module. The signaling information input to the carrier allocation A module and the carrier allocation B module may be represented as p[n] (n being a integer greater than 0). Here, p[n] may be represented as p[0] to p[N−1] (N being the number of carriers to which all signaling information is allocated (or arranged). The carrier allocation A module and the carrier allocation B module may allocate (or arrange) the signaling information p[n] to carriers on the basis of different carrier allocation tables.

For example, the carrier allocation A module can respectively allocate p[0], p[1] and p[N−1] to the first, second and N-th carriers. The carrier allocation B module can respectively allocate p[N−1], p[N−2], p[N−3] and p[0] to the first, second, third and N-th carriers.

The preamble insertion blocks illustrated in FIGS. 20 and 21 can generate the first half of the robust preamble and the second half of the robust preamble using different scrambling sequences or using the same scrambling sequence and different carrier allocation schemes. Signal waveforms of the first half and the second half of the robust preamble generated according to an embodiment of the present invention may differ from each other. Accordingly, data offset due to a multipath channel is not generated even when the same signaling information is repeatedly transmitted in the time domain.

Figure 22:
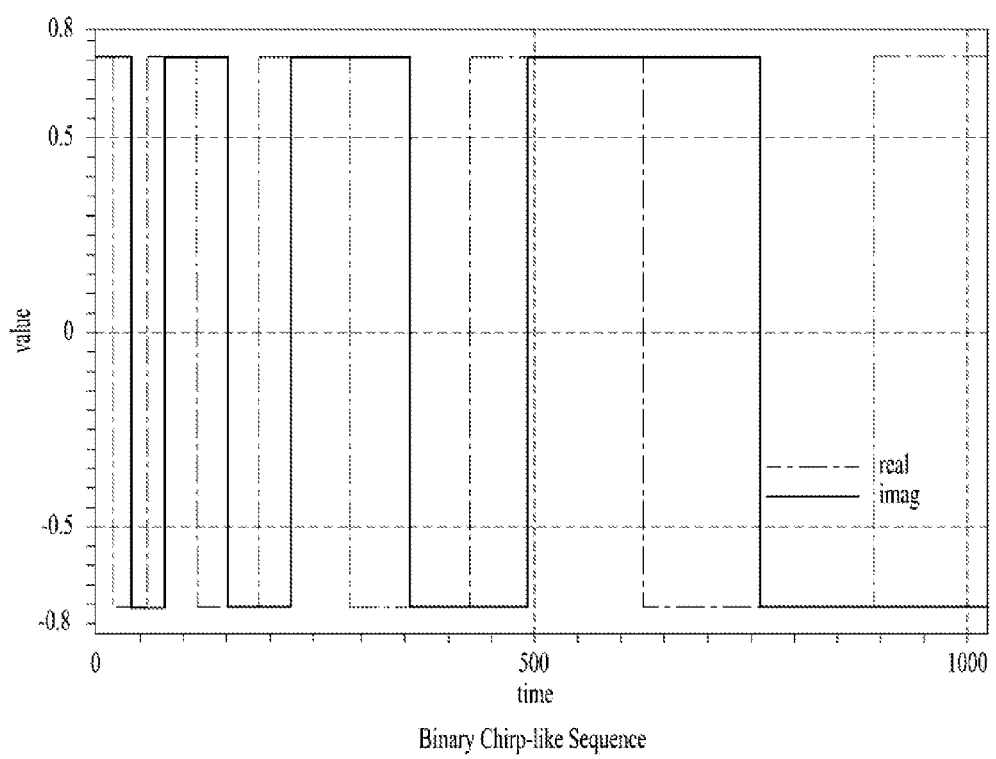
FIG. 22 is a graph showing a scrambling sequence according to an embodiment of the present invention.

FIG. 22 is a graph showing a scrambling sequence according to an embodiment of the present invention.

This graph shows a waveform of a binary chirp-like sequence. The binary chirp-like sequence is an embodiment of a signal that can be used as a scrambling sequence of the present invention. The binary chirp-like sequence is a sequence which is quantized such that the real part and imaginary part of each signal value respectively have only '1' and '−1'. The binary chirp-like sequence shown in FIG. 22 is composed of a plurality of square waves having different periods and a sequence period is 1024 according to an embodiment.

The binary chirp-like sequence has the following advantages. Firstly, the binary chirp-like sequence does not generate dangerous delay since the binary chirp-like sequence is composed of signals having different periods. Secondly, the binary chirp-like sequence provides correct symbol timing information compared to conventional broadcast systems since correlation characteristics are similar to those of guard interval correlation and is resistant to noise on a multipath channel compared to a sequence having delta-like correlation such as an m-sequence. Thirdly, when scrambling is performed using the binary chirp-like sequence, bandwidth is less increased compared to the original signal. Fourthly, the binary chirp-like sequence is a binary sequence and thus can be used to design a device having low complexity.

In the graph showing the waveform of the binary chirp-like sequence, the solid line represents a waveform corresponding to a real part and a dotted line represents an imaginary part. The waveforms of the real part and the imaginary part of the binary chirp-like sequence correspond to square waves.

Figure 23:
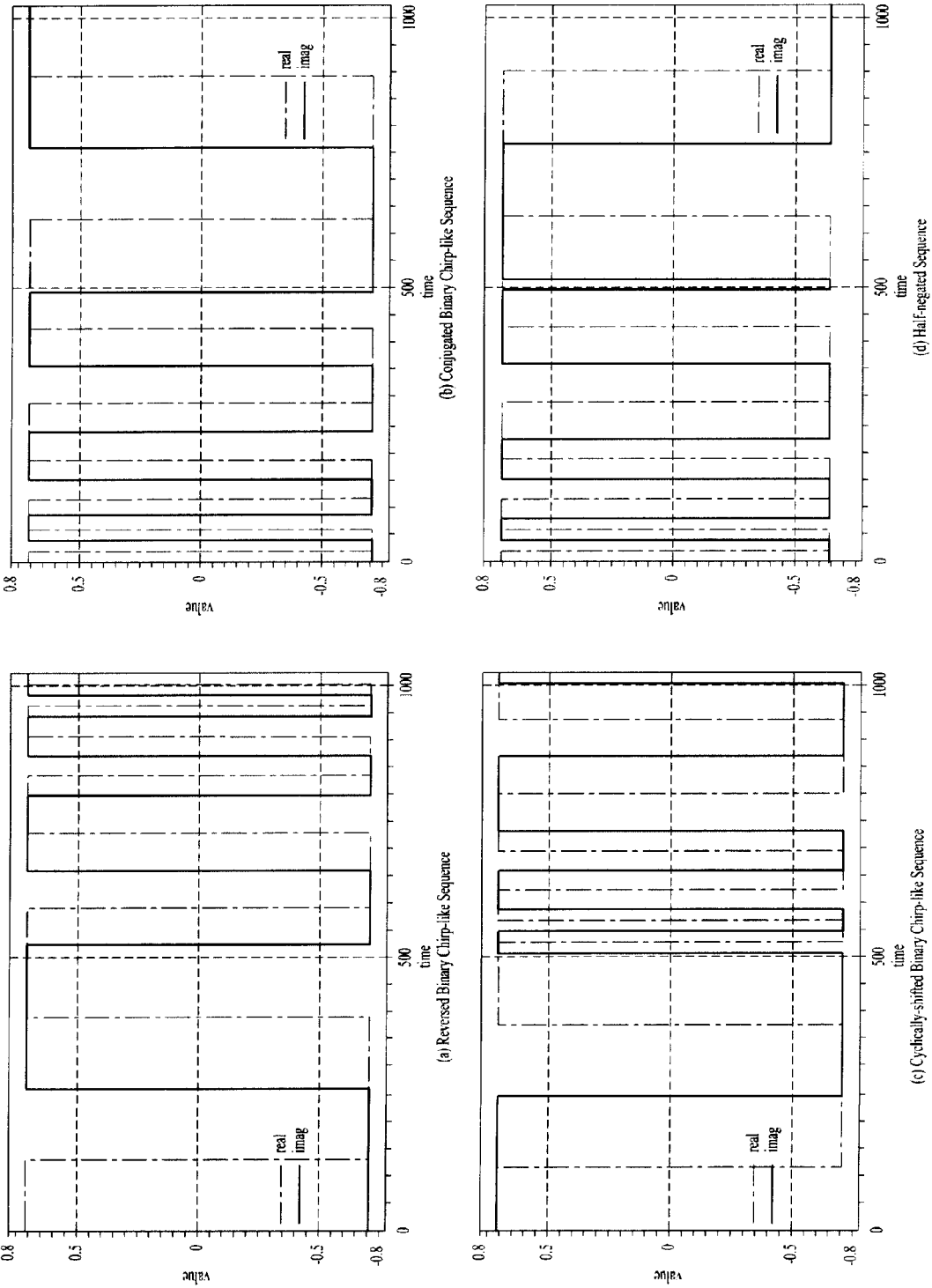
FIG. 23 illustrates examples of scrambling sequences modified from the binary chirp-like sequence according to an embodiment of the present invention.

FIG. 23 illustrates examples of scrambling sequences modified from the binary chirp-like sequence according to an embodiment of the present invention.

FIG. 23($a$) shows a reversed binary chirp-like sequence obtained by reversely arranging the binary chirp-like sequence in the time domain.

FIG. 23($b$) shows a conjugated binary chirp-like sequence obtained by complex conjugating the binary chirp-like sequence. That is, the real part of the conjugated binary chirp-like sequence equals the real part of the binary chirp-like sequence and the imaginary part of the conjugated binary chirp-like sequence equals the imaginary part of the binary chirp-like sequence in terms of absolute value and is opposite to the imaginary part of the binary chirp-like sequence in terms of sign.

FIG. 23($c$) shows a cyclically-shifted binary chirp-like sequence obtained by cyclically shifting the binary chirp-like sequence by a half period, that is, 512.

FIG. 23($d$) shows a half-negated sequence. A front half period, that is, 0 to 512 of the half-negated chirp-like sequence equals that of the binary chirp-like sequence and the real part and imaginary part of a rear half period, that is, 513 to 1024 of the half-negated chirp-like sequence equals that of the binary chirp-like sequence in terms of absolute value and is opposite to the binary chirp-like sequence in terms of sign.

The average of the above-described scrambling sequence is 0. Even when a continuous wave interference is generated in a signal and thus a complex DC is present in an output of a differential decoder of the broadcast signal reception apparatus, the scrambling sequence having an average of 0 can be multiplied by the complex DC of the output of the differential decoder to prevent the complex DC from affecting signal detection performance.

The broadcast signal transmission apparatus according to an embodiment of the present invention can use the scrambling sequences shown in FIGS. 22 and 23 differently according to whether the EAS message is included in the preamble. For example, when the broadcast signal transmission apparatus does not include the EAS message in the preamble, the guard interval of the preamble can be scrambled using the scrambling sequence of FIG. 22. When the broadcast signal transmission apparatus includes the EAS message in the preamble, the guard interval of the preamble can be scrambled using one of the scrambling sequences of FIG. 23.

The scrambling sequences shown in the figures are exemplary and may be modified according to designer.

Figure 24:
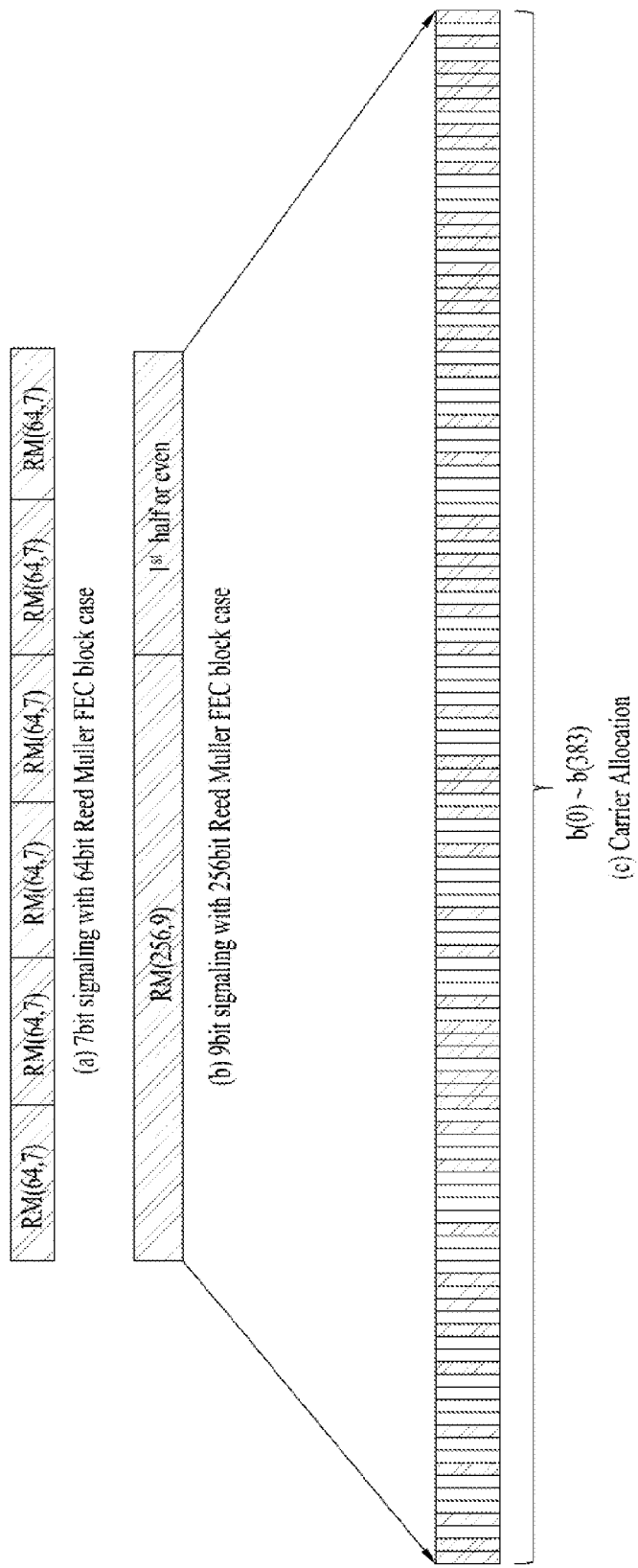
FIG. 24 illustrates a signaling information structure in the preamble according to an embodiment of the present invention.

FIG. 24 illustrates a signaling information structure in the preamble according to an embodiment of the present invention.

Specifically, FIG. 24 shows the structure of signaling information transmitted through the preamble in the frequency domain according to an embodiment of the present invention.

FIGS. 24($a$) and 24($b$) illustrate repetition or arrangement of data by the data formatter 17010 according to the length of a code block of Reed Muller encoding performed by the Reed Muller encoder 17000. The code block of Reed Muller encoding may be referred to as a Reed Muller FEC block.

The data formatter 17010 may repeat or arrange the signaling information output from the Reed Muller encoder 17000 according to the length of the code block such that the signaling information corresponds to the number of active carriers. FIGS. 24($a$) and ($b$) show an embodiment in which the number of active carriers is 384.

Accordingly, when the Reed Muller encoder 17000 performs Reed Muller encoding on a 64-bit block, as shown in FIG. 24($a$), the data formatter 17010 can repeat the same data six times. In this case, the Reed Muller encoder 17000 can use a $1^{st}$ order Reed Muller code and signaling information of each Reed Muller code may be 7 bits.

When the Reed Muller encoder 17000 performs Reed Muller encoding on a 256-bit block, as shown in FIG. 24($b$), the data formatter 17010 can repeat front 128 bits or rear 128 bits of the 256-bit code block or repeat even-numbered 128 bits or odd-numbered 128 bits of the 256-bit code block to arrange data as 384 bits. In this case, the Reed Muller encoder 17000 can use a $1^{st}$ order Reed Muller code and signaling information of each Reed Muller code may be 9 bits.

As described above, the signaling information formatted by the data formatter 17010 may be processed through the cyclic delay block 17020 and the interleaver 17030 or not, mapped through the DQPSK/DBPSK mapper 17040, scrambled by the scrambler 17050 and then input to the carrier allocation block 17060.

FIG. 24(c) illustrates a method for allocating the signaling information to active carriers through the carrier allocation block 17060 according to an embodiment of the present invention. In FIG. 24(c), b(n) (n being an integer equal to or greater than 0) represents carriers to which data is allocated. In one embodiment, the number of carriers is 384. Colored carriers from among the carriers shown in FIG. 24(c) denote active carriers and uncolored carriers denote null carriers. Positions of the active carriers shown in FIG. 24(c) may be changed according to designer.

Figure 25:
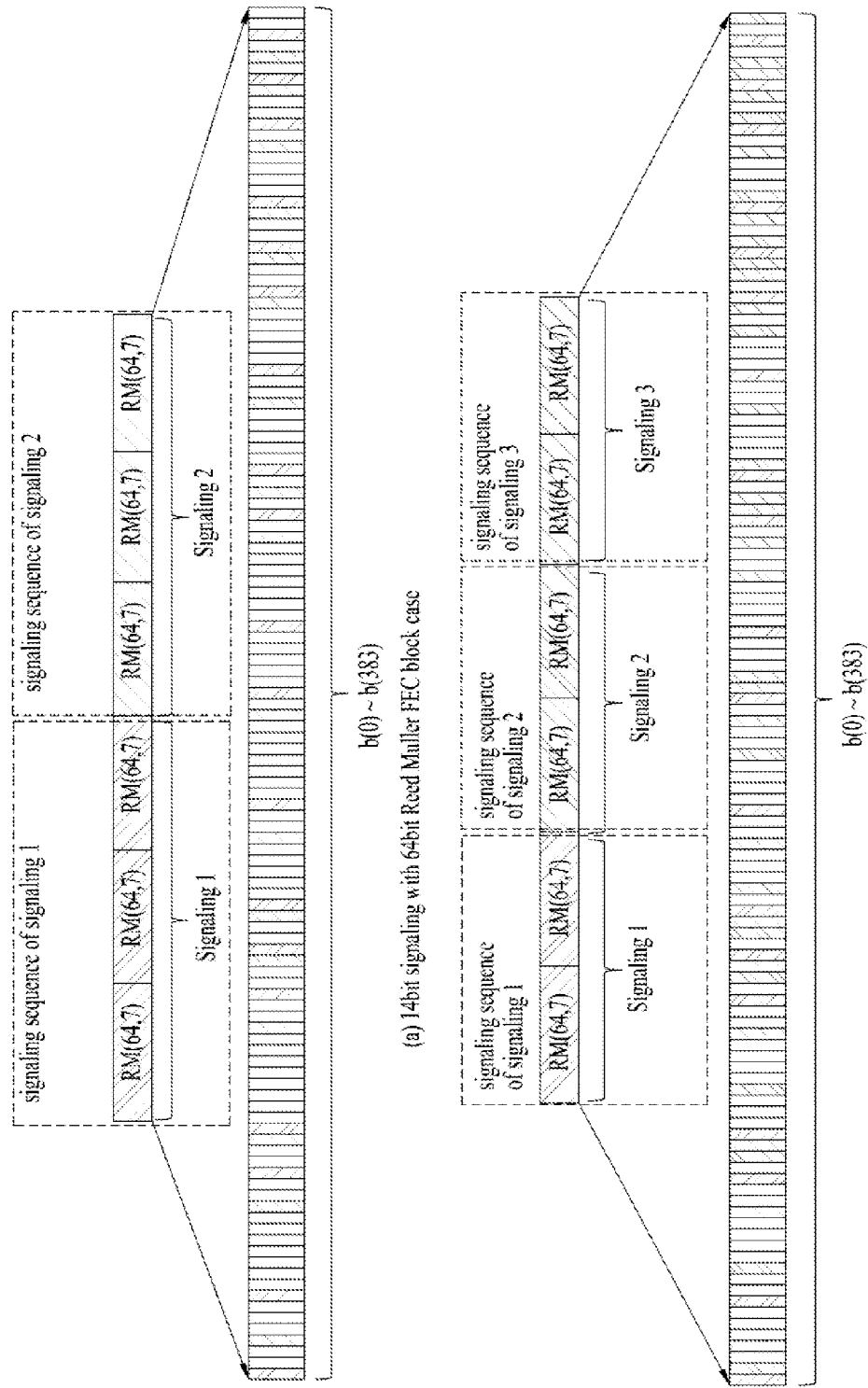
FIG. 25 illustrates a procedure of processing signaling data transmitted through the preamble according to an embodiment of the present invention.

FIG. 25 illustrates a procedure of processing signaling data transmitted through the preamble according to an embodiment of the present invention.

The signaling data transmitted through the preamble may include a plurality of signaling sequences. Each signaling sequence may be 7 bits. The number and size of the signaling sequences may be changed according to designer.

FIG. 25(a) shows a procedure of processing the signaling data transmitted through the preamble when the signaling data is 14 bits according to an embodiment of the present invention. In this case, the signaling data transmitted through the preamble may include two signaling sequences which may be referred to as signaling 1 and signaling 2. Signaling 1 and signaling 2 may be the same signaling sequences as the aforementioned signaling sequences S1 and S2.

FIG. 25(b) shows a procedure of processing the signaling data transmitted through the preamble when the signaling data is 21 bits according to an embodiment of the present invention. In this case, the signaling data transmitted through the preamble may include three signaling sequences which may be referred to as signaling 1, signaling 2 and signaling 3. Signaling 1, signaling 2 and signaling 3 may be the same signaling sequences as the aforementioned signaling sequences S1, S2 and S3.

As shown in FIG. 25, the interleaving block 17030 according to an embodiment of the present invention may sequentially alternately assign S1 and S2 to active carriers.

The number of carriers is 384 and the carriers may be represented by sequential numerals starting from 0 in one embodiment. Accordingly, the first carrier according to an embodiment of the present invention can be represented by b(0), as shown in FIG. 25). Uncolored active carriers shown in FIG. 25 denote null carriers to which S1, S2 or S3 is not arranged (or allocated).

A detailed description will be given of assignment of signaling information to signaling fields and active carriers.

(b) Bit sequences of S1 and bit sequences of S2 according to an embodiment of the present invention are signaling sequences which may be allocated to active carriers in order to transmit independent signaling information (or signaling fields) included in the preamble.

Specifically, S1 can carry 3-bit signaling information and can be configured in a structure in which a 64-bit sequence is repeated twice. In addition, S1 can be arranged before and after S2. S2 is a 256-bit sequence and can carry 4-bit signaling information. The bit sequences of S1 and S2 of the present invention may be represented by sequential numerals starting from 0 according to one embodiment. Accordingly, the first bit sequence of S1 can be represented as S1 (0) and the first bit sequence of S2 can be represented as S2 (0). Representation of the bit sequences may be changed according to designer.

S1 may carry information for identifying each signal frame included in the superframe described above with reference to FIG. 16, for example, information indicating an SISO-processed signal frame, MISO-processed signal frame or FEF. S2 may carry information about an FFT size of the current signal frame or information indicating whether frames multiplexed in one superframe are of the same type. Information carried through S2 may be changed according to designer.

Signaling 1 and signaling 2 may be respectively encoded into 64-bit Reed Muller codes by the aforementioned Reed Muller encoder. FIG. 25(a) shows a Reed-Muller-encoded signaling sequence block.

The encoded signaling sequence blocks of signaling 1 and signaling 2 may be repeated three times by the aforementioned data formatter. FIG. 25(a) shows the repeated signaling sequence block of signaling 1 and the repeated signaling sequence block of signaling 2. Since the Reed-Muller-encoded signaling sequence block is 64 bits, the signaling sequence block of each of signaling 1 and signaling 2, repeated three times, is 192 bits.

Data of signaling 1 and signaling 2, composed of 6 blocks, alternately rearranged, sequentially input to the cyclic delay block 17020 and the interleaver 17030 and processed therein or mapped by the DBPSK/DQPSK mapper 17040 without undergoing processing of the cyclic delay block 17020 and the interleaver 17030, and then allocated to 384 carriers by the aforementioned carrier allocation block. In FIG. 25(a), b(0) may denote the first carrier and b(1) and b(2) may denote carriers. In one embodiment of the present invention, a total of 384 carriers b(0) to b(383) may be present. From among carriers shown in the figure, colored carriers denote active carriers and uncolored carriers denote null carriers. Active carriers represent carriers to which signaling data is allocated and null carriers represent carriers to which signaling data is not allocated. As described above, the data of signaling 1 and signaling 2 may be alternately allocated to carriers. For example, data of signaling 1 can be allocated to b(0), data of signaling 2 can be allocated to b(3) and data of signaling 1 can be allocated to b(7). The positions of the active carriers and null carriers may be changed according to designer.

(b) The signaling information transmitted through the preamble according to an embodiment of the present invention may be transmitted through the bit sequences of S1, bit sequences of S2 and bit sequences of S3.

S1, S2 and S3 according to an embodiment of the present invention are signaling sequences which can be allocated to active carriers in order to transmit independent signaling information (or signaling fields) included in the preamble.

Specifically, S1, S2 and S3 can respectively carry 3-bit signaling information and can be configured in a structure in which a 64-bit sequence is repeated twice. Accordingly, S1, S2 and S3 can further carry 2-bit signaling information compared to the embodiment of FIG. 25(b).

In addition, S1 and S2 can carry the signaling information described with reference to FIGS. 25 and S3 can carry signaling information about a guard interval length (or guard length). Signaling information carried through S1, S2 and S3 may be changed according to designer.

Data of signaling 1, signaling 2 and signaling 3, composed of 6 blocks, is alternately rearranged, sequentially input to the cyclic delay block 17020 and the interleaver 17030 and processed thereby or mapped by the DBPSK/DQPSK mapper 17040 without undergoing processing of the cyclic delay block 17020 and the interleaver 17030, and then allocated to 384 carriers by the aforementioned carrier allocation block.

The bit sequences of S1, S2 and S3 may be represented by sequential numerals starting from 0, that is, m S1 (0), . . . . Referring to FIG. 25(*b*), the number of carriers is 384 and the carriers may be represented by sequential numerals starting from 0, that is b(0), . . . according to one embodiment of the present invention. The number and representation method of the carriers may be changed according to designer.

Figure 26:
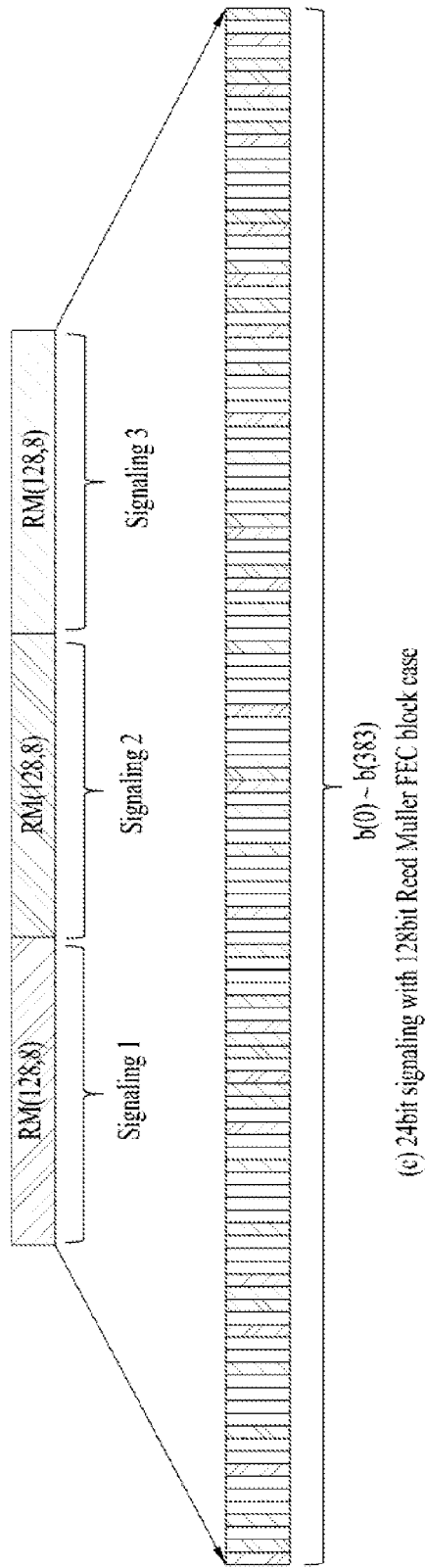
FIG. 26 illustrates a procedure of processing signaling data transmitted through the preamble according to an embodiment of the present invention.

Referring to FIG. 26, S1, S2 and S3 may be sequentially alternately allocated to active carriers in determined positions in the frequency domain.

Specifically, the bit sequences of S1, S2 and S3 can be sequentially allocated to active carriers other than null carriers from among the active carriers b(0) to b(383).

Each of signaling 1, signaling 2 and signaling 3 may be respectively encoded into a 64-bit Reed Muller code by the aforementioned Reed Muller encoder. FIG. 26(*b*) shows a Reed-Muller-encoded signaling sequence block.

The encoded signaling sequence blocks of signaling 1, signaling 2 and signaling 3 may be repeated twice by the aforementioned data formatter. FIG. 26(*b*) shows the repeated signaling sequence block of signaling 1, the repeated signaling sequence block of signaling 2 and the repeated signaling sequence block of signaling 3. Since each Reed-Muller-encoded signaling block is 64 bits, the signaling sequence block of each of signaling 1, signaling 2 and signaling 3, repeated twice, is 128 bits.

Signaling 1, signaling 2 and signaling 3, composed of six blocks, may be allocated to 384 carriers by the aforementioned carrier allocation block. In FIG. 26(*b*), b(0) may be the first carrier and b(1) and b(2) may be other carriers. In one embodiment, 384 carriers b(0) to b(383) may be present. Colored carriers from among the carriers shown in the figure denote active carriers and uncolored carriers denote null carriers. Active carriers may be carriers to which signaling data is allocated and null carriers may be carriers to which signaling data is not allocated. Data of signaling 1, signaling 2 and signaling 3 may be alternately allocated to carriers. For example, data of signaling 1 can be allocated to b(0), data of signaling 2 can be allocated to b(1), data of signaling 3 can be allocated to b(3) and data of signaling 1 can be allocated to b(7). The positions of the active carriers and null carriers shown in the figure may be changed according to designer.

FIG. 26 illustrates a procedure of processing signaling data transmitted through the preamble according to an embodiment of the present invention.

In FIG. 26(*c*) shows a procedure of processing signaling data transmitted through the preamble when the signaling data is 24 bits. In this case, the signaling data transmitted through the preamble may include three signaling sequences which may be referred to as signaling 1, signaling 2 and signaling 3. Signaling 1, signaling 2 and signaling 3 may be the same signaling sequences as the aforementioned signaling information S1, S2 and S3. The procedure of processing the signaling data is the same as the procedure described with reference to FIG. 25(*b*).

As described above with reference to FIGS. 25 and 26, a signaling data capacity and a signaling data protection level can be traded off by controlling the length of an FEC-encoded signaling data block. That is, while the signaling data capacity increases as the length of the signaling data block increases, the number of repetitions of the data formatter decreases and the signaling data protection level is lowered. Accordingly, it is possible to select various signaling capacities.

Furthermore, the interleaver 17030 according to an embodiment of the present invention can uniformly interleave data of each signaling field in the frequency domain. Accordingly, frequency diversity characteristics of the preamble can be maximized and robustness against frequency selective fading can be improved.

Figure 27:
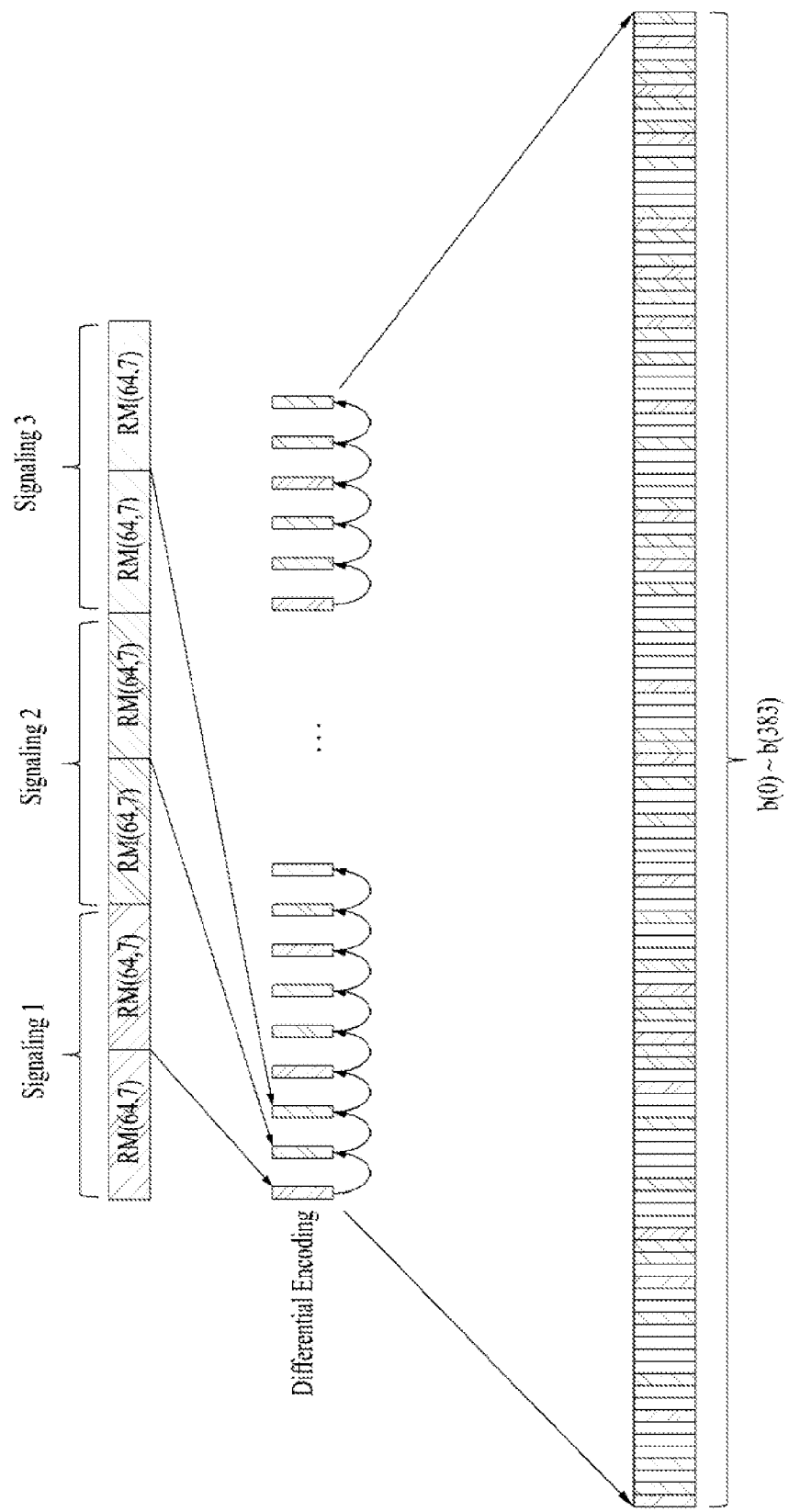
FIG. 27 illustrates a differential encoding operation that can be performed by a preamble insertion module according to an embodiment of the present invention.

FIG. 27 illustrates a differential encoding operation that can be performed by a preamble insertion module according to an embodiment of the present invention.

The preamble insertion module according to an embodiment of the present invention may repeat signaling information (S1, S2 and S3 represented as signaling 1, signaling 2 and signaling 3 in FIG. 27) twice. Then, the preamble insertion module may sequentially alternately arrange repeated bits of S1, S2 and S3. Alternatively, the data formatter according to an embodiment of the present invention may repeat and arrange the signaling information, as described above. Subsequently, the preamble insertion module may differential-encode consecutive bits (indicated by curved arrows in the figure). Alternatively, the data formatter or DQPSK/DBPSK mapper according to an embodiment of the present invention may differential-encode the consecutive bits, as described above. The preamble insertion module may scramble the differentially encoded signaling bits and sequentially alternately allocate the bits of S1, S2 and S3 to corresponding carriers. Alternatively, the carrier allocation module according to an embodiment of the present invention may scramble the differential encoded signaling bits and sequentially alternately allocate the bits of S1, S2 and S3 to the corresponding carriers.

Figure 28:
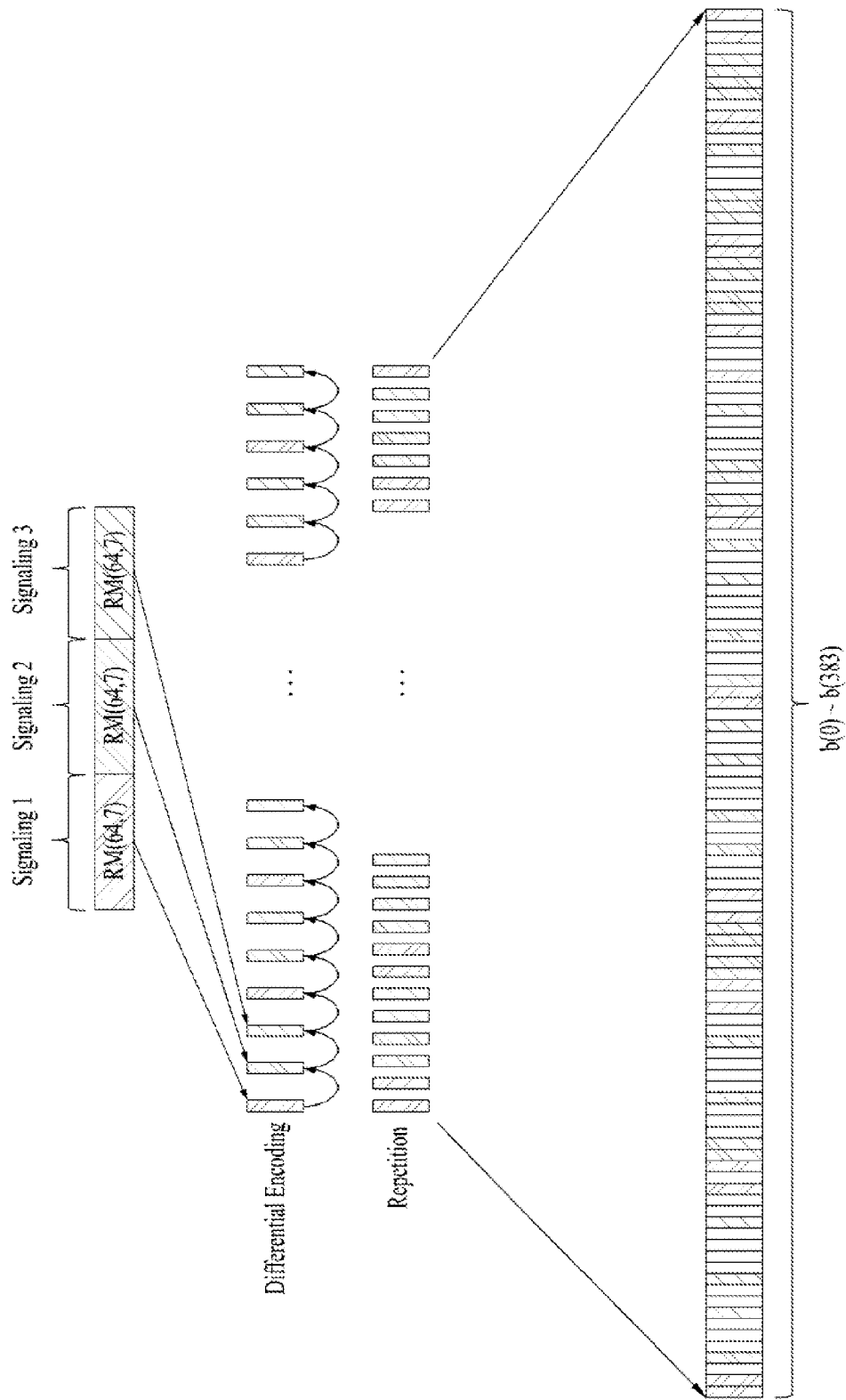
FIG. 28 illustrates a differential encoding operation that can be performed by a preamble insertion module according to another embodiment of the present invention.

FIG. 28 illustrates a differential encoding operation that can be performed by a preamble insertion module according to another embodiment of the present invention.

Operations of the preamble insertion module according to the present embodiment shown in FIG. 28 may correspond to the operations of the preamble insertion modules shown in FIG. 27. In addition, operations of the data formatter, DQPSK/DBPSK mapper and carrier allocation module which may be included in the preamble insertion module according to the present embodiment, shown in FIG. 28, may correspond to operations of modules which may be included in the preamble insertion module shown in FIG. 27.

However, order of the operations may be changed. Specifically, the preamble insertion module according to the present embodiment may repeat signaling information after differential encoding, distinguished from the operation of the preamble insertion module shown in FIG. 27. That is, the preamble insertion module can sequentially alternately arrange the unrepeated bits of S1, S2 and S3. Then, the preamble insertion module can perform differential encoding of the arranged consecutive bits (indicated by curved arrows in the figure). Then, the preamble insertion module may repeat the differentially encoded signaling bits and sequentially alternately allocate the repeated bits to corresponding carriers.

Operations of a signaling decoder of a preamble detector, which will be described later, may depend on the order of differential encoding and data repetition of the preamble insertion modules described with reference to FIGS. 27 and 28. Detailed operations of the signaling decoder will be described later.

Figure 29:
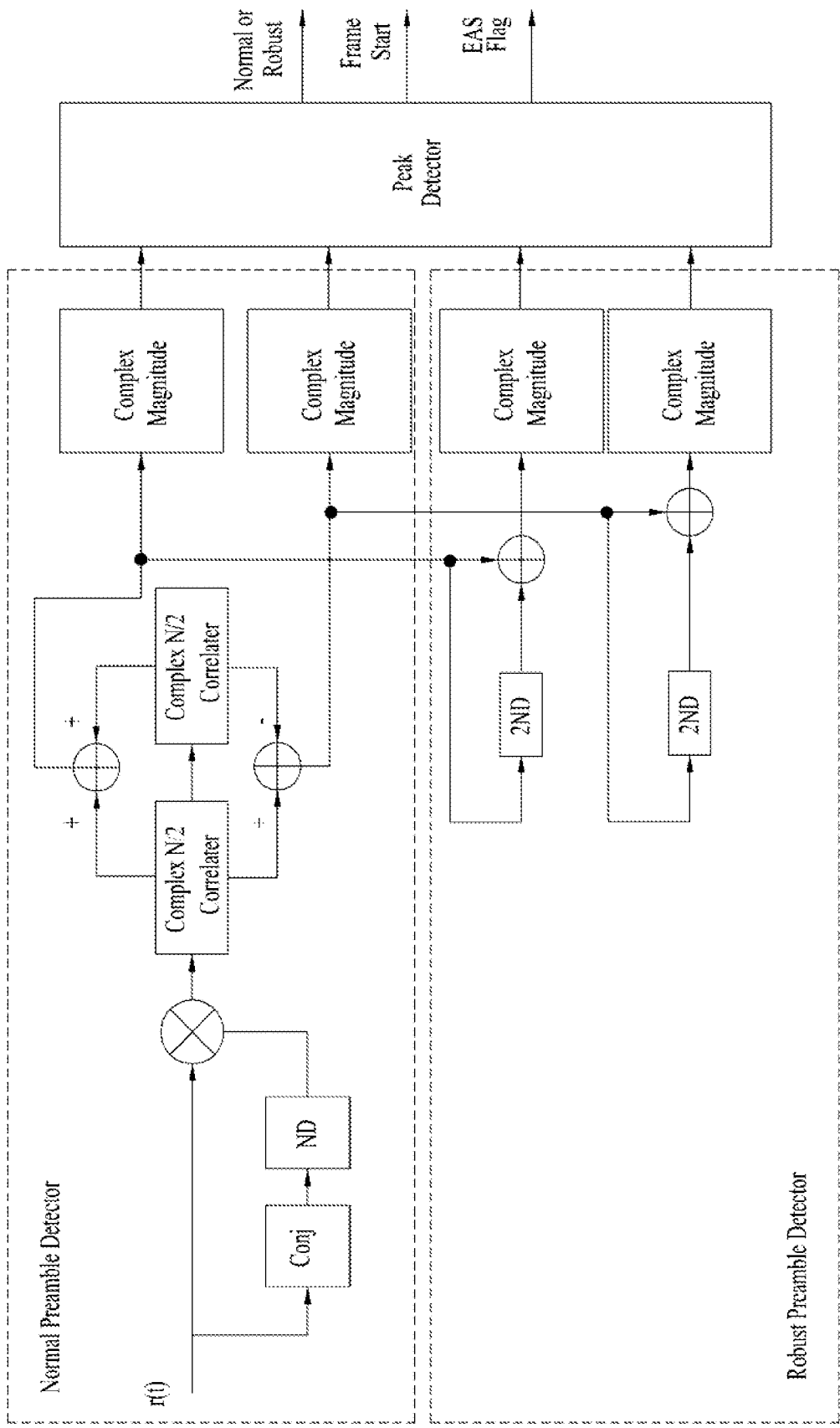
FIG. 29 is a block diagram of a correlation detector included in a preamble detector according to an embodiment of the present invention.

FIG. 29 is a block diagram of a correlation detector included in a preamble detector according to an embodiment of the present invention.

Specifically, FIG. 29 shows a configuration of the aforementioned preamble detector 9300 according to one embodiment, that is, a configuration of a preamble correlation detector for detecting the aforementioned robust preamble.

The preamble correlation detector according to an embodiment of the present invention may include a normal preamble correlation detector (represented as a normal preamble detector in FIG. 29) and a robust preamble correlation detector (represented as a robust preamble detector in FIG. 29).

The robust preamble according to an embodiment of the present invention may have a structure in which the scrambled guard interval and data region are alternately arranged. The normal preamble correlation detector may obtain correlation of the first half of the robust preamble. The robust preamble correlation detector may obtain correlation of the second half of the robust preamble.

A description will be given of operation of the normal preamble correlation detector when the preamble received by the normal preamble correlation detector includes information related to the EAS message and the broadcast signal transmission apparatus uses the binary chirp-like sequence of FIG. 22 and the half-negated sequence of FIG. 23(d) to signal the information related to the EAS message through the preamble.

The normal preamble correlation detector may multiply signals (i) and (ii), obtained by delaying received signals (i) r(t) and (ii) r(t) by an FFT size, N, and conjugating the delayed signals, by each other.

The normal preamble correlation detector may generate the signal (ii) by conjugating r(t) and then delaying the conjugated r(t) by the FFT size, N. In FIG. 29, a block conj and a block ND (N Delay) can generate the signal (ii).

A complex N/2 correlator may output correlation between the signal obtained by multiplying (i) by (ii) and a scrambling sequence. As described above, the first half period N/2 of the half-negated sequence equals the first half period N/2 of the binary chirp-like sequence and the sign of the second half period of the half-negated sequence is opposite to the sign of the second half period N/2 of the binary chirp-like sequence. Accordingly, the sum of outputs of two complex N/2 correlators may be correlation with respect to the binary chirp-like sequence and a difference between the outputs of the two complex N/2 correlators may be correlation with respect to the half-negated sequence.

The robust preamble correlation detector may detect correlation on the basis of the two sequence correlations detected by the normal preamble detector. The robust preamble correlation detector may detect correlation of the binary chirp-like sequence by summing (i) correlation detected by the normal preamble detector and (ii) correlation obtained by delaying a sequence detected by the normal preamble detector by 2N.

The robust preamble correlation detector can detect correlation by delaying a sequence detected by the normal preamble detector by 2N corresponding to the length of OFDM data and scrambled GI since the robust preamble has a structure in which the OFDM data and scrambled GI are repeated twice.

Complex magnitude blocks of the normal preamble correlation detector and the robust preamble correlation detector may output complex magnitude values of correlations detected through correlators. A peak detector block may detect a peak of complex magnitude values of input correlations. The peak detector block may detect a preamble position from the detected peak and perform OFDM symbol timing synchronization and fractional frequency offset synchronization to output frame start information. In addition peak detector block may output information about preamble type, that is, the normal preamble or the robust preamble and information (EAS flag) about whether the preamble includes the EAS message.

Figure 30:
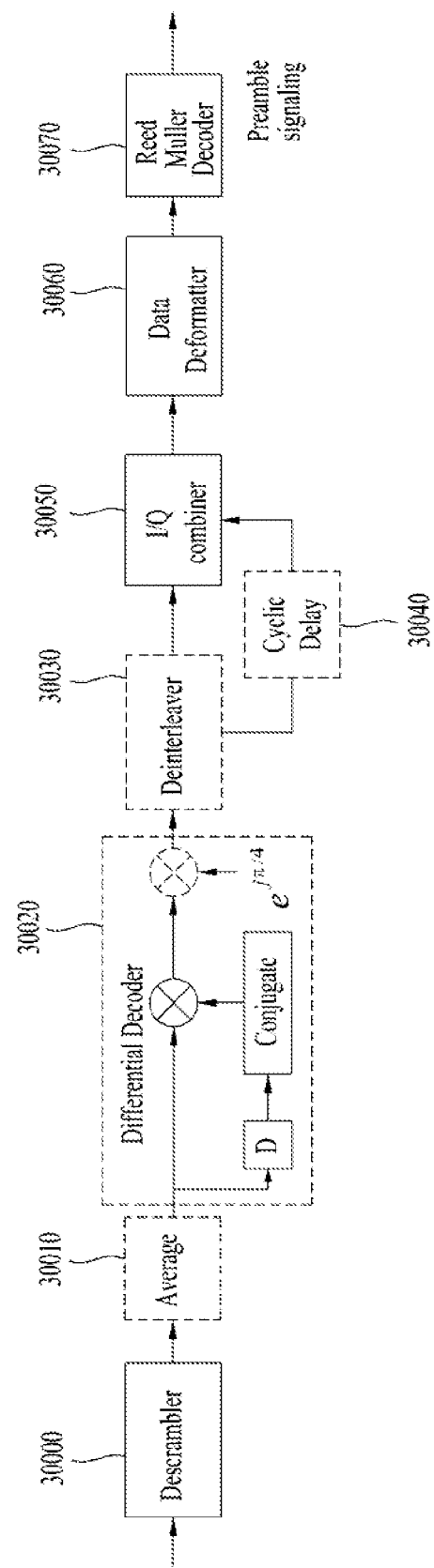
FIG. 30 illustrates a signaling decoder of a preamble detector according to an embodiment of the present invention.

FIG. 30 illustrates a signaling decoder of a preamble detector according to an embodiment of the present invention.

Specifically, FIG. 30 shows an embodiment of the preamble detector 9300 described above with reference to FIG. 9, which can perform a reverse of the operation of the preamble insertion block shown in FIG. 17.

The preamble detector according to an embodiment of the present invention may include a correlation detector, an FFT block, an ICFO estimator, a carrier allocation table block, a data extractor and a signaling decoder. Each block may be modified according to designer or may not be included in the preamble detector.

A description will be given of modules constituting the signaling decoder and operations thereof.

The signaling decoder may include a descrambler 30000, an average block 30010, a differential decoder 30020, a deinterleaver 30030, a cyclic delay block 30040, an I/Q combiner 30050, a data deformatter 30060 and a Reed Muller decoder 30070.

The descrambler 30010 may descramble received signaling data.

When the broadcast signal transmission apparatus repeats signaling information and then differential-encodes the repeated signaling information, as described with reference to FIG. 27, the average block 30010 can be omitted. The differential decoder 30020 may receive the descrambled signal and perform DBPSK or DQPSK demapping on the descrambled signal.

Alternatively, when the broadcast signal transmission apparatus differential-encodes signaling information and then repeats the differential encoded signaling information, as described with reference to FIG. 28, the average block 30010 may average corresponding symbols of the descrambled signaling data and then the differential decoder 30020 may perform DBPSK or DQPSK demapping on the averaged signal. The average block may calculate a data average on the basis of the number of repetitions of the signaling information.

A description will be given of detailed operation of the differential decoder 30020.

When a transmitter receives a DQPSK-mapped signal, the differential decoder 30020 may perform phase rotation by $\pi/4$ on the differential decoded signal. Accordingly, the differential decoded signal can be segmented into in-phase and quadrature components.

When the transmitter has performed interleaving, the deinterleaver 30030 may deinterleave the signal output from the differential decoder 30020.

When the transmitter has performed cyclic delay, the cyclic delay block 30040 may perform a reverse of the cyclic delay operation performed in the transmitter.

The I/Q combiner 30050 may combine I and Q components of the deinterleaved signal or delayed signal.

When the signal received from the transmitter has been DBPSK mapped, the I/Q combiner 30050 can output only the I component of the deinterleaved signal.

Then, the data deformatter 30060 may combine bits of signals output from the I/Q combiner 30050 per signaling field to output the signaling information. When the broadcast signal transmission apparatus repeats the signaling information and then differential encode the repeated signaling information, the data deformatter 30060 can average the bits of the signaling information.

Subsequently, the Reed Muller decoder 30070 may decode the signaling information output from the data deformatter 30060.

Accordingly, the broadcast signal reception apparatus according to an embodiment of the present invention can obtain the signaling information transmitted using the preamble through the aforementioned procedure.

Figure 31:
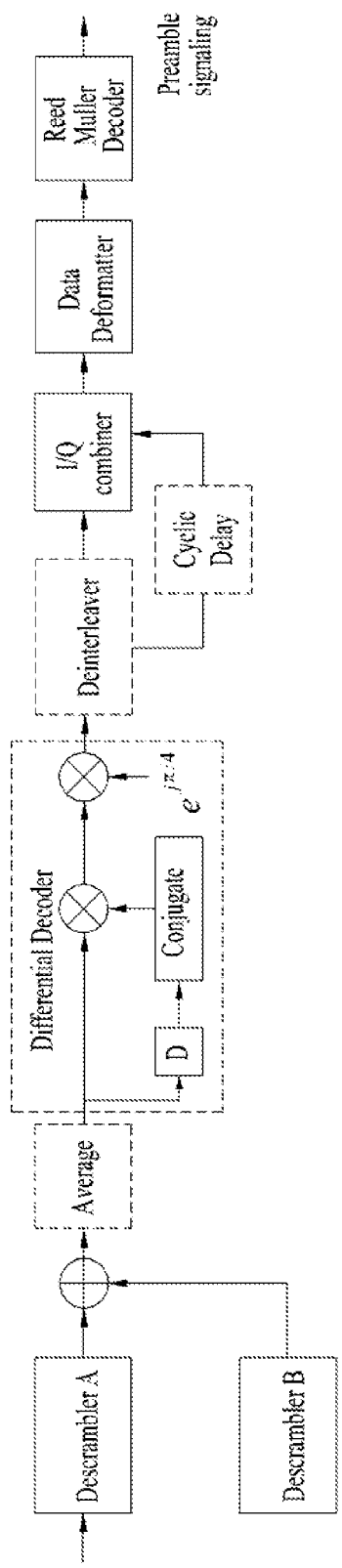
FIG. 31 illustrates a signaling decoder of a preamble detector according to an embodiment of the present invention.

FIG. 31 illustrates a signaling decoder of a preamble detector according to an embodiment of the present invention.

Specifically, FIG. 31 shows an embodiment of the preamble detector 9300 described above with reference to FIG. 9, which can perform a reverse of the operation of the preamble insertion block shown in FIG. 20, that is, detect the robust preamble.

The preamble detector according to an embodiment of the present invention may include a correlation detector, an FFT block, an ICFO estimator, a carrier allocation table block, a data extractor and a signaling decoder, as described above. Each block may be modified according to designer or may not be included in the preamble detector.

Modules constituting the signaling decoder and operations thereof will now be described.

The signaling decoder may include a descrambler A, a descrambler B, an average block, a differential decoder, a deinterleaver, a cyclic delay block, an I/Q combiner, a data deformatter and a Reed Muller decoder.

Operations of the descrambler A and descrambler B may correspond to the operation of the aforementioned descrambler 30000.

Operations of other modules may correspond to operations of the modules shown in FIG. 30.

The descrambler A and descrambler B according to an embodiment of the present invention may descramble OFDM data A and OFDM data B by multiplying the OFDM data A and OFDM data B by a scrambling sequence. Then, the signaling decoder may sum descrambled data output from the descrambler A and descrambler B. Subsequent operations of the signaling decoder may be identical to corresponding operations of the signaling decoder shown in FIG. 30.

Figure 32:
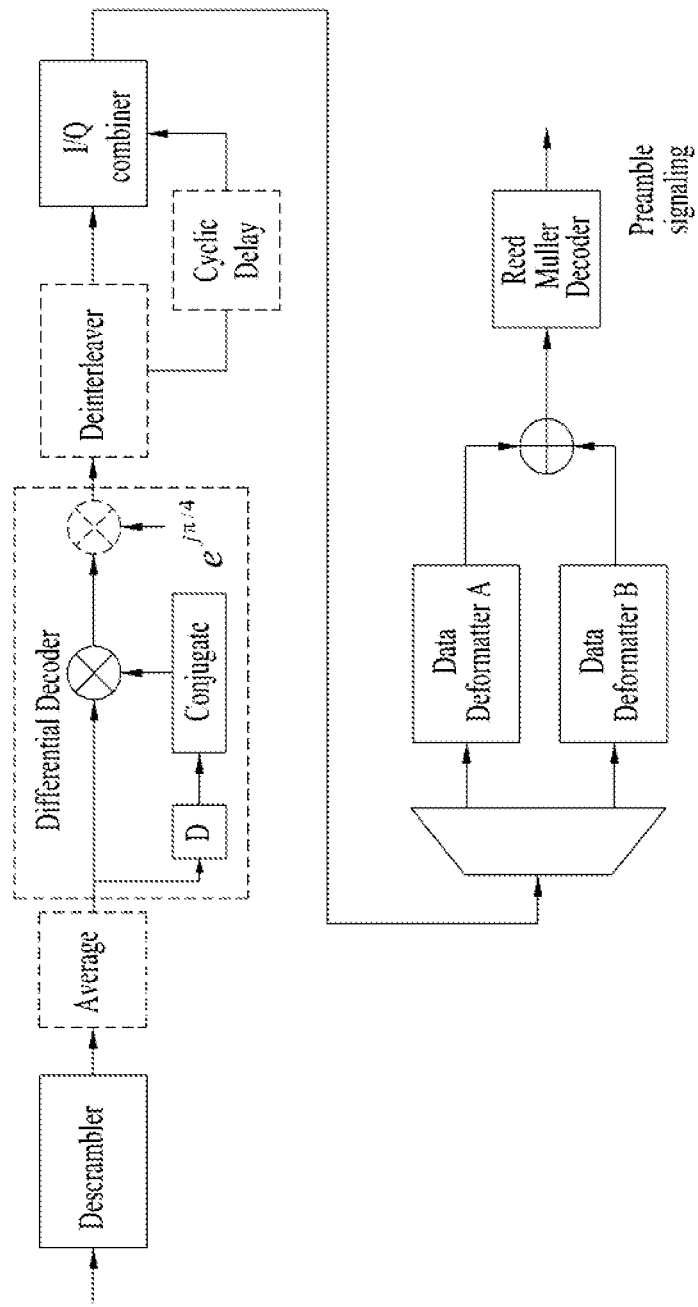
FIG. 32 illustrates a signaling decoder of a preamble detector according to an embodiment of the present invention.

FIG. 32 illustrates a signaling decoder of a preamble detector according to an embodiment of the present invention.

Specifically, FIG. 32 shows an embodiment of the preamble detector 9300 described above with reference to FIG. 9, which can perform a reverse of the operation of the preamble insertion block shown in FIG. 21, that is, detect the robust preamble. The preamble detector according to an embodiment of the present invention may include a correlation detector, an FFT block, an ICFO estimator, a carrier allocation table block, a data extractor and a signaling decoder. Each block may be modified according to designer or may not be included in the preamble detector.

Modules constituting the signaling decoder and operations thereof will now be described.

The signaling decoder may include a descrambler, an average block, a differential decoder, a deinterleaver, a cyclic delay block, an I/Q combiner, a data deformatter A, a data deformatter B and a Reed Muller decoder.

Operations of the data deformatter A and data deformatter B may correspond to the operation of the aforementioned data deformatter 30060. Operations of the descrambler, average block, differential decoder, deinterleaver, cyclic delay block and I/Q combiner may correspond to the operations of the modules shown in FIG. 30.

Specifically, the data deformatter A and data deformatter B may combine signaling information corresponding to OFDM data A or OFDM data B from among bits of signals output from the I/Q combiner per signaling field to output signaling information. Then, the signaling information combined per OFDM data output from the data deformatter A and data deformatter B and per signaling field are combined and input to the Reed Muller decoder module. The Reed Muller decoder module may decode the input signaling information.

Figure 33:
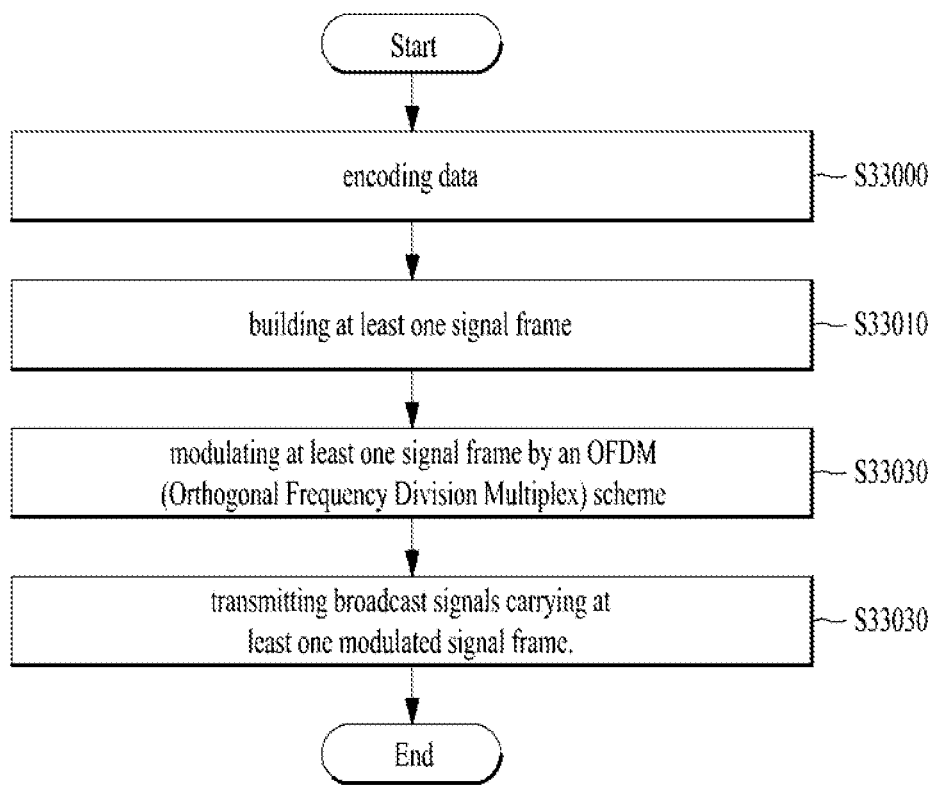
FIG. 33 is a flowchart illustrating a method for transmitting a broadcast signal according to an embodiment of the present invention.

FIG. 33 is a flowchart illustrating a method for transmitting a broadcast signal according to an embodiment of the present invention.

The broadcast signal transmission apparatus according to an embodiment of the present invention may code (encode) data (or service data) carrying at least one broadcast service component (S33000). Data according to an embodiment of the present invention may be processed per DP corresponding to each data, as described above. Data encoding may be performed by a coding and modulation module 1100.

Then, the broadcast signal transmission apparatus according to an embodiment of the present invention may build at least one signal frame (S33010). The broadcast signal transmission apparatus according to an embodiment of the present invention may map DP data to data symbols to generate a signal frame. As described above, the signal frame may include a preamble, PLS symbol, data symbol and edge symbol. The signal frame may be generated by a frame structure module 1200.

The broadcast signal transmission apparatus according to an embodiment of the present invention may modulate the at least one signal frame by OFDM (S33020). Subsequently, the broadcast signal transmission apparatus according to an embodiment of the present invention may insert a preamble into the at least one signal frame. The preamble inserted into the signal frame may be a normal preamble or a robust preamble. The broadcast signal transmission apparatus according to an embodiment of the present invention may insert the normal preamble or robust preamble into the signal frame according to channel environment in which the signal frame is transmitted. As described above, the robust preamble may be generated by repeating the normal preamble. In this case, the first half of the robust preamble is exactly the same as the normal preamble, and the second half of the robust preamble is a simple variation of the normal preamble where the difference arises from the sequence SSS applied in the frequency domain.

The preamble insertion block 7500 according to an embodiment of the present invention may insert the aforementioned preamble into the signal frame.

The preamble insertion block 7500 according to an embodiment of the present invention may respectively generate the first half and the second half of the robust preamble using different scrambling sequences or using the same scrambling sequence but different carrier allocation schemes. The first half and the second half of the robust preamble generated according to the present embodiment of the present invention may have different signal waveforms in the time domain. Accordingly, data offset due to a multipath channel is not generated even when the same signaling information is repeatedly transmitted in the time domain.

The broadcast signal transmission apparatus according to an embodiment of the present invention may transmit at least one broadcast signal including the at least one modulated signal frame (S33030).

Figure 34:
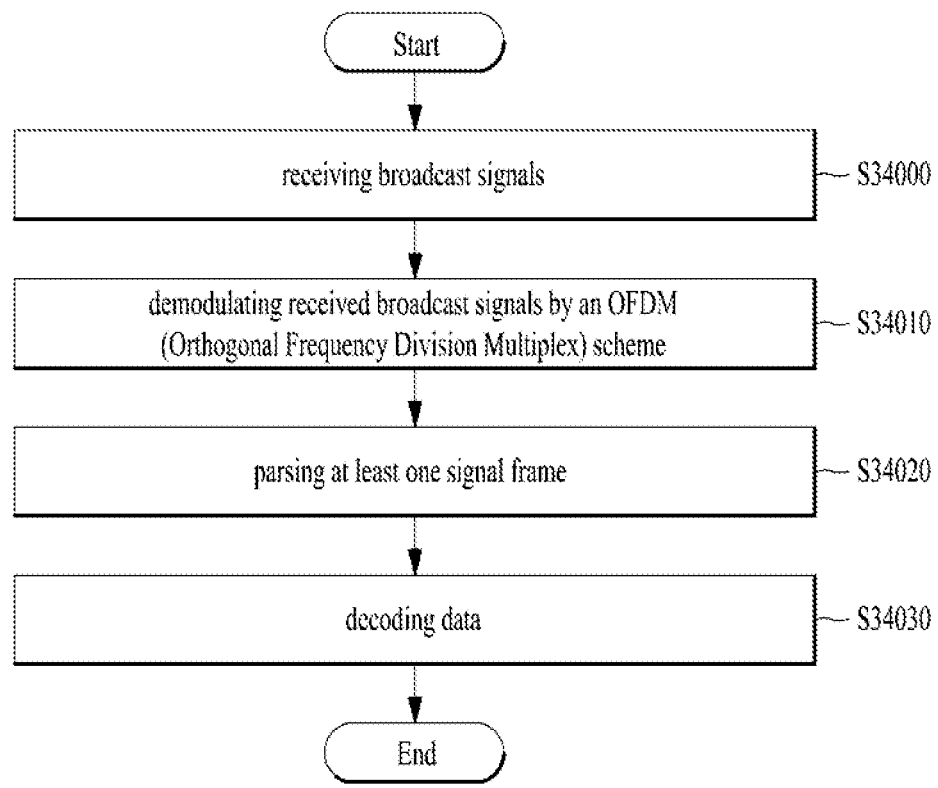
FIG. 34 is a flowchart illustrating a method for receiving a broadcast signal according to an embodiment of the present invention.

FIG. 34 is a flowchart illustrating a method for receiving a broadcast signal according to an embodiment of the present invention.

FIG. 34 is a reverse process of the broadcast signal transmission method illustrated in FIG. 33.

The broadcast signal reception apparatus according to an embodiment of the present invention may receive at least one broadcast signal (S34000). A broadcast signal according to an embodiment of the present invention may include at least one signal frame. Each signal frame may include a preamble, edge symbol, PLS symbol and data symbol. As described above, the broadcast signal reception apparatus that has received the at least one broadcast signal may detect the preamble included in the broadcast signal and descramble the preamble on the basis of a scrambling sequence used for the broadcast signal transmission apparatus to generate the preamble. In this case, the preamble may be a normal preamble or a robust preamble. After descrambling, the broadcast signal reception apparatus may acquire signaling data including the preamble.

The preamble detector 9300 according to an embodiment of the present invention may detect, descramble and decode the preamble. That is, the preamble detector 9300 may perform a reverse of the operation of the preamble insertion block 7500.

Detailed operation of the preamble detector has been described with reference to FIGS. 29 to 32.

Subsequently, the broadcast signal reception apparatus according to an embodiment of the present invention may demodulate the received at least one broadcast signal by OFDM (S34010). Demodulation of the broadcast signal may be performed by the synchronization and demodulation module 8000.

Then, the broadcast signal reception apparatus according to an embodiment of the present invention may parse at least one signal frame from the demodulated broadcast signal (S34020). The signal frame may be parsed by the frame parsing module 8100.

The broadcast signal reception apparatus according to an embodiment of the present invention may decode service data carrying at least one broadcast service component (S34030). Data decoding may be performed by the demapping and decoding module 8200.

What is claimed is:

1. A method for transmitting broadcast signals by a broadcast signal transmitter, the method comprising:
    encoding service data corresponding to each of a plurality of data transmission paths;
    building signal frames including data symbols for the encoded service data;
    modulating the signal frames by an Orthogonal Frequency Division Multiplex (OFDM) scheme to convert the data symbols to data OFDM symbols;
    inserting a preamble positioned at a start of the modulated signal frames in a time domain after the OFDM modulating step;
    wherein the preamble contains a first OFDM symbol and a second OFDM symbol,
    wherein each OFDM symbol in the preamble is generated by multiplying a sequence corresponding to signaling information with a different sequence, subcarrier allocating the multiplied sequence and Inverse Fast Fourier Transforming (IFFT) the allocated sequence,
    wherein the first OFDM symbol and the second OFDM symbol in the preamble include information for an emergency alert; and
    transmitting the broadcast signals carrying the modulated signal frames having the preamble,
    wherein each signal frame is assigned to a frame type with a Fast Fourier Transform (FFT) size, a guard interval length and a pilot pattern, and
    wherein when two adjacent signal frames having different frame types are multiplexed in the broadcast signals, a preceding signal frame further includes a tail edge OFDM symbol being positioned at an end of the preceding signal frame.

2. The method of claim 1,
    wherein the first OFDM symbol and the second OFDM symbol in the preamble include different data in the frequency domain, respectively.

3. The method of claim 1, wherein pilots of the tail edge OFDM symbol are denser than pilots of the data OFDM symbols.

4. An apparatus for transmitting broadcast signals, the apparatus comprising:
    an encoder to encode service data corresponding to each of a plurality of data transmission paths;
    a frame builder to build signal frames including data symbols for the encoded service data;
    a modulator to modulate the signal frames by an Orthogonal Frequency Division Multiplex (OFDM) scheme to convert the data symbols to data OFDM symbols;
    an inserter to insert a preamble positioned at a start of the OFDM modulated signal frames in a time domain;
    wherein the preamble contains a first OFDM symbol and a second OFDM symbol,
    wherein each OFDM symbol in the preamble is generated by multiplying a sequence corresponding to signaling information with a different sequence, subcarrier allocating the multiplied sequence and Inverse Fast Fourier Transforming (IFFT) the allocated sequence,
    wherein the first OFDM symbol and the second OFDM symbol in the preamble include information for an emergency alert; and
    a transmitter to transmit the broadcast signals carrying the modulated signal frames having the preamble,
    wherein each signal frame is assigned to a frame type with a Fast Fourier Transform (FFT) size, a guard interval length and a pilot pattern, and
    wherein when two adjacent signal frames having different frame types are multiplexed in the broadcast signals, a preceding signal frame further includes a tail edge OFDM symbol being positioned at an end of the preceding signal frame.

5. The apparatus of claim 4,
    wherein the first OFDM symbol and the second OFDM symbol in the preamble include different data in the frequency domain, respectively.

6. The method of claim 4, wherein pilots of the tail edge OFDM symbol are denser than pilots of the data OFDM symbols.

* * * * *